(12) United States Patent
Kido et al.

(10) Patent No.: US 9,856,386 B2
(45) Date of Patent: Jan. 2, 2018

(54) INKJET INK, INKJET RECORDING METHOD USING THE INKJET INK, AND PRINT FORMED BY THE INKJET INK

(71) Applicants: Masahiro Kido, Kanagawa (JP);
Naohiro Toda, Kanagawa (JP);
Tomohiro Nakagawa, Kanagawa (JP);
Juichi Furukawa, Kanagawa (JP);
Hidefumi Nagashima, Kanagawa (JP);
Hikaru Kobayashi, Kanagawa (JP)

(72) Inventors: Masahiro Kido, Kanagawa (JP);
Naohiro Toda, Kanagawa (JP);
Tomohiro Nakagawa, Kanagawa (JP);
Juichi Furukawa, Kanagawa (JP);
Hidefumi Nagashima, Kanagawa (JP);
Hikaru Kobayashi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 195 days.

(21) Appl. No.: 14/869,213

(22) Filed: Sep. 29, 2015

(65) Prior Publication Data
US 2016/0102220 A1    Apr. 14, 2016

(30) Foreign Application Priority Data

Oct. 10, 2014    (JP) ................. 2014-208635

(51) Int. Cl.
| | | |
|---|---|---|
| *C09D 11/40* | (2014.01) | |
| *B05D 1/36* | (2006.01) | |
| *C08G 18/48* | (2006.01) | |
| *C08G 18/66* | (2006.01) | |
| *C08G 18/75* | (2006.01) | |
| *C08G 18/08* | (2006.01) | |

(Continued)

(52) U.S. Cl.
CPC .......... *C09D 11/40* (2013.01); *C08G 18/0823* (2013.01); *C08G 18/246* (2013.01); *C08G 18/44* (2013.01); *C08G 18/4854* (2013.01); *C08G 18/6659* (2013.01); *C08G 18/6692* (2013.01); *C08G 18/755* (2013.01); *C08L 75/06* (2013.01); *C09D 11/10* (2013.01); *C09D 11/102* (2013.01); *C09D 11/322* (2013.01)

(58) Field of Classification Search
None
See application file for complete search history.

(56) References Cited

U.S. PATENT DOCUMENTS

| | | | | |
|---|---|---|---|---|
| 2011/0032304 A1* | 2/2011 | Mozel | ............ | D06P 1/0032 347/21 |
| 2013/0182057 A1* | 7/2013 | Koase | ............ | B41J 11/002 347/102 |

(Continued)

FOREIGN PATENT DOCUMENTS

| | | |
|---|---|---|
| JP | 54-059936 | 5/1979 |
| JP | 6-071882 | 3/1994 |

(Continued)

*Primary Examiner* — Vu A Nguyen
(74) *Attorney, Agent, or Firm* — Oblon, McClelland, Maier & Neustadt, L.L.P.

(57) ABSTRACT

An inkjet ink set is provided. The inkjet ink set includes a first ink including a resin A and an organic solvent A; and a second ink including a resin B and an organic solvent which is the same as or different from the organic solvent A. The minimum film forming temperature (MFT) of the resin A is lower than that of the resin B.

14 Claims, 2 Drawing Sheets

(51) Int. Cl.
*C08G 18/24* (2006.01)
*C08G 18/44* (2006.01)
*C08L 75/06* (2006.01)
*C09D 11/10* (2014.01)
*C09D 11/102* (2014.01)
*C09D 11/322* (2014.01)

(56) References Cited

U.S. PATENT DOCUMENTS

| | | | |
|---|---|---|---|
| 2013/0222480 A1* | 8/2013 | Aoki | B41J 2/2117 347/40 |
| 2013/0249996 A1* | 9/2013 | Saito | C09D 1/00 347/21 |
| 2014/0192112 A1 | 7/2014 | Nagashima et al. | |
| 2014/0267520 A1 | 9/2014 | Toda et al. | |
| 2014/0377516 A1 | 12/2014 | Toda et al. | |
| 2015/0017396 A1 | 1/2015 | Nakagawa et al. | |
| 2015/0050467 A1 | 2/2015 | Nakagawa et al. | |
| 2015/0077479 A1 | 3/2015 | Nakagawa et al. | |
| 2015/0077482 A1 | 3/2015 | Toda et al. | |
| 2015/0116433 A1 | 4/2015 | Fujii et al. | |
| 2015/0165787 A1* | 6/2015 | Fujii | B41J 11/002 347/102 |
| 2015/0191614 A1 | 7/2015 | Nagashima et al. | |
| 2015/0259553 A1* | 9/2015 | Nakagawa | C09D 11/36 347/54 |

FOREIGN PATENT DOCUMENTS

| | | |
|---|---|---|
| JP | 2005-220352 | 8/2005 |
| JP | 2010-173314 | 8/2010 |
| JP | 2011-094082 | 5/2011 |

* cited by examiner

INKJET INK, INKJET RECORDING METHOD USING THE INKJET INK, AND PRINT FORMED BY THE INKJET INK

CROSS-REFERENCE TO RELATED APPLICATIONS

This patent application is based on and claims priority pursuant to 35 U.S.C. §119 to Japanese Patent Application No. 2014-208635 filed on Oct. 10, 2014 in the Japan Patent Office, the entire disclosure of which is hereby incorporated by reference herein.

BACKGROUND

Technical Field

This disclosure relates to an inkjet ink. In addition, this disclosure relates to an inkjet recording method using the inkjet ink, and to a print formed by the inkjet ink.

Description of the Related Art

Recently, inkjet recording technology has been used not only for household products, but also for industrial applications such as prints for use as display and posters, and prints posted on bulletin boards. However, when the inkjet recording technology is used for industrial applications while using porous recording media for prints, the prints have poor durability (i.e., poor light resistance, water resistance and abrasion resistance). Therefore, non-porous recording media such as plastic films are typically used for the prints in the industrial applications. In addition, inkjet inks, which can be used for such non-porous recording media, have been developed. Specific examples of the inkjet inks, which have been developed so as to be used for such non-porous recording media, include solvent-type inkjet inks using an organic solvent as a vehicle, and ultraviolet crosslinkable inkjet inks using a polymerizable monomer as a main component.

However, the solvent-type inkjet inks have a drawback such that the solvents evaporated from the inks cause environmental pollution, and the ultraviolet crosslinkable inkjet inks have a drawback such that it is hard to choose a proper polymerizable monomer, which has a good combination of ink property and safeness.

Against such a background, aqueous inkjet inks, which can directly form images on non-porous recording media and which are environmental friendly, have been developed recently.

In general, a solvent-type inkjet ink is fixed on a non-porous recording medium (i.e., non-porous base material) by swelling the recording medium with the solvent included in the ink. Therefore, the solvent-type ink image formed on the recording medium has good adhesiveness with the recording medium. In contrast, an image formed on such a non-porous recording medium by an aqueous inkjet ink is merely located on the surface of the recording medium, and therefore the ink image typically has poor adhesiveness with the recording medium.

In addition, non-porous recording media typically have a high glossiness. If the ink image formed on a non-porous recording medium has a glossiness largely different from the glossiness of the recording medium, the print (i.e., the ink image and the recording medium) lacks a feeling of unity. Therefore, it is preferable for inkjet inks used for non-porous recording media to produce images having a high glossiness.

Since a resin is dissolved in a solvent-type inkjet ink, the image formed by the solvent-type inkjet ink forms a smooth film after being dried, and therefore the image has a high glossiness. In contrast, since particles of a resin are dispersed in an aqueous inkjet ink, the image formed by the aqueous inkjet ink is constituted of united resin particles, and therefore the glossiness of the image formed by the aqueous inkjet ink is relatively low compared to that of the image formed by the solvent-type inkjet ink.

Further, prints used for outdoor application are required to have much better abrasion resistance than prints used for indoor application. However, it is hard for an aqueous inkjet ink to produce a print having the same abrasion resistance as that of a print formed by a solvent-type inkjet ink. Namely, a need exists for an aqueous inkjet ink capable of producing a print having better abrasion resistance.

SUMMARY

As an aspect of this disclosure, an inkjet ink set is provided which includes a first ink, and a second ink. The first ink includes a resin A and an organic solvent A, and the second ink includes a resin B and an organic solvent which is the same as or different from the organic solvent A. The minimum film forming temperature (MFT) of the resin A is lower than that of the resin B.

As another aspect of this disclosure, an inkjet recording method is provided which includes ejecting droplets of the first ink of the inkjet ink set mentioned above by applying at least one of heat energy and mechanical energy thereto to form a first layer on a recording medium; and ejecting droplets of the second ink of the inkjet ink set by applying at least one of heat energy and mechanical energy thereto to form a second layer on the first layer.

As another aspect of this disclosure, a print is provided which includes a recording medium; and an ink image including a first layer including the resin A of the first ink of the inkjet ink set mentioned above and a second layer including the resin B of the second ink of the inkjet ink set, wherein the first layer is located on the recording medium and the second layer is located on the first layer.

The aforementioned and other aspects, features and advantages will become apparent upon consideration of the following description of the preferred embodiments taken in conjunction with the accompanying drawings.

DETAILED DESCRIPTION

Figure 1:
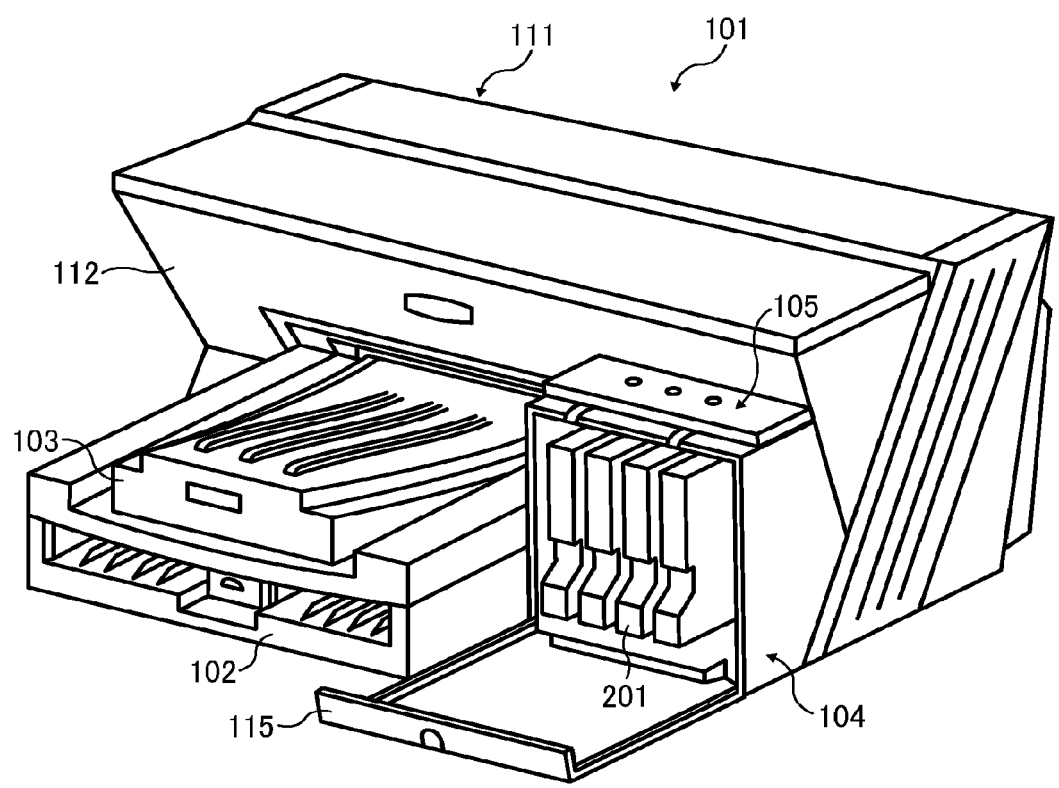
FIG. 1 is a schematic view illustrating a serial inkjet printer for use in the inkjet recording method according to an embodiment.

According to the present inventors' investigation, the aqueous inkjet inks, which are mentioned above and which have been developed recently, are inferior in image qualities to solvent-type inkjet inks.

The object of this disclosure is to provide an inkjet ink, which can produce a glossy image having a good combination of adhesiveness with recording media (i.e., base materials) and abrasion resistance.

Initially, the inkjet ink of this disclosure will be described in detail. In addition, the inkjet recording method of this disclosure and the print of this disclosure, which uses the inkjet ink of this disclosure, will be also described in combination.

(1) The inkjet ink of this disclosure is an inkjet ink set including a first ink, and a second ink. The first ink includes a resin A and an organic solvent A, and the second ink includes a resin B and an organic solvent which is the same as or different from the organic solvent A. The minimum film forming temperature (MFT) of the resin A is lower than that of the resin B.

The inkjet ink of this disclosure includes the following (2) to (12) ink sets.

(2) The inkjet ink set according to the inkjet ink set (1), which is characterized in that the minimum film forming temperature (hereinafter referred to as MFT) of the resin A is lower than the MFT of the resin B by 30° C. or more.

(3) The inkjet ink set according to the inkjet ink set (1) or (2), which is characterized in that the MFT of the resin B is not lower than 50° C. and lower than 200° C.

(4) The inkjet ink set according to any one of the inkjet ink sets (1) to (3), which is characterized in that the MFT of the resin A is lower than 0° C.

(5) The inkjet ink set according to any one of the inkjet ink sets (1) to (4), which is characterized in that at least one of the first ink and the second ink includes a colorant.

(6) The inkjet ink set according to any one of the inkjet ink sets (1) to (5), which is characterized in that one of the first ink and the second ink is a white ink and the other is a non-white ink.

(7) The inkjet ink set according to any one of the inkjet ink sets (1) to (6), which is characterized in that each of the resin A and the resin B is granular.

(8) The inkjet ink set according to any one of the inkjet ink sets (1) to (7), which is characterized in that each of the first ink and the second ink further includes water.

(9) The inkjet ink set according to any one of the inkjet ink sets (1) to (8), which is characterized in that each of the first ink and the second ink further includes water and a colorant.

(10) The inkjet ink set according to any one of the inkjet ink sets (1) to (9), which is characterized in that each of the resin A and the resin B is a urethane resin.

(11) The inkjet ink set according to the inkjet ink set (10), which is characterized in that each of the resin A and the resin B is a polycarbonate urethane resin.

(12) The inkjet ink set according to the inkjet ink set (11), which is characterized in that the polycarbonate urethane resin includes a unit obtained from an alicyclic diisocyanate (hereinafter sometimes referred to as an alicyclic diisocyanate-derived unit).

This disclosure includes the following inkjet recording methods (13) and (14).

(13) An inkjet recording method including ejecting droplets of the first ink of any one of the inkjet ink sets (1) to (12) by applying at least one of heat energy and mechanical energy to the first ink to form a first layer on a recording medium; and ejecting droplets of the second ink of the inkjet ink set by applying at least one of heat energy and mechanical energy to the second ink to form a second layer on the first layer.

(14) The inkjet recording method according to the inkjet recording method (13), which is characterized in that the method further includes heating the recording medium after forming the second layer, and the first ink is a white ink while the second ink is a non-white ink.

This disclosure includes the following print (15).

(15) A print including a recording medium, and an ink image including a first layer and a second layer, wherein the first layer is formed on the recording medium by the first ink of any one of the inkjet ink sets (1) to (12) and the second layer is formed on the first layer by the second ink of the inkjet ink set.

This disclosure is not limited to the below-mentioned embodiments, and additional modifications and variations are possible. In addition, in this application, "non-white color" means colors other than white color, and "print" means a material in which an image is formed on a recording medium using an ink. In addition, "clear ink" means an inkjet ink, which includes no colorant and which includes, as main components, a resin emulsion, a water soluble organic solvent, and water.

In general, as the MFT of a resin emulsion increases, the hardness of the film formed by the resin emulsion increases. However, the adhesiveness of the film with a base material (i.e., recording medium) increases as the MFT of the resin emulsion decreases, because the film formed by a resin emulsion having a low MFT is soft and has an ability of following the surface of the base material.

The present inventors discover that the object of this disclosure mentioned above can be attained by an inkjet ink set including a first ink which is to be applied on a recording medium to form a first image (i.e., first layer) thereon and which includes a first resin emulsion, and a second ink which is to be applied on the first layer and which includes a second resin emulsion, wherein the MFT of the first resin emulsion is lower than the MFT of the second resin emulsion. The first ink is preferably a white ink, but is not limited thereto as mentioned below.

The mechanism to attain the object is considered as follows.

Specifically, when droplets of the first ink are ejected and strike the recording medium, the resin (hereinafter sometimes referred to as the resin A) in the droplets of the first ink forms a film (first layer) as water, and the solvent included in the first ink are dried. In this regard, since the MFT of the resin A is relatively low, the first layer has good adhesiveness with the recording medium. Thereafter the second ink are applied on the first layer, and the resin (resin B) in the second ink forms a film (second layer) as water, and the solvent included in the second ink are dried. In this regard, since the MFT of the resin B is relatively high, the second layer has a good combination of toughness and abrasion resistance. By intentionally forming an ink image having such a layer structure, a good combination of adhesiveness and abrasion resistance can be imparted to the ink image (i.e., print).

Thus, the object of this disclosure can be attained (i.e., a print having good combination of adhesiveness with recording media and abrasion resistance can be produced) by the inkjet ink set (1) mentioned above.

Even when the second layer formed by the resin B of the second ink is hard and brittle, the hard and brittle second layer is complemented by the resin A, resulting in impartment of toughness and flexibility to the ink image. In this regard, it is preferable that the resins A and B have affinity for each other. Specifically, it is preferable for the resins A and B to have affinity for each other such that when the resins A and B (first and second resin emulsions) are located at a temperature not lower than the MFT of one of the first and second resin emulsions, the resins A and B have partial compatibility or complete compatibility with each other. However, as described in Examples below, it is not necessary that the resins A and B are the same kind of resin. It can be easily understood from the term "MFT" that the resins A and B are preferably emulsions of the resins A and B. In this case, it is preferable that the resins A and B exhibit partial or complete solvation property to the medium of the emulsions, or are partially swelled in the medium.

Polycarbonate urethane resins have a good combination of water resistance, heat resistance, abrasion resistance, and weather resistance due to the polycarbonate group thereof, which has a high cohesive force. Therefore, when one of the resins A and B is a polycarbonate urethane resin, the print of the ink has good abrasion resistance. Particularly, it is more preferable that the resin B is a polycarbonate urethane resin, because the print of the ink has better abrasion resistance. Such ink can be used for prints for outdoor application, which are placed in a severe environment.

In addition, it is more preferable that the polycarbonate urethane resin included in the ink has a unit obtained from at least one alicyclic diisocyanate compound (i.e., an alicyclic diisocyanate-derived unit), because the print produced by the ink has better abrasion resistance.

The constituents of the inkjet ink of this disclosure will be described,

1. Resin

The resin used for the inkjet ink of this disclosure is not particularly limited. However, it is preferable that the ink includes an emulsion of a resin, in which particles of the resin is stably dispersed in a dispersion medium (water).

In the inkjet ink set of this disclosure, which includes a first ink and a second ink, the MFT of the resin A included in the first ink is lower than that of the resin B included in the second ink. In this application, the MFT of a resin is determined by the following method.

(1) An aqueous dispersion liquid of a resin is applied on a metal plate (e.g., aluminum plate) so that a thin layer of the dispersion liquid is formed on the metal plate, followed by natural drying (i.e., drying at the ambient temperature);
(2) The process (1) is repeated while changing (increasing) the ambient temperature; and
(3) Each of the dried resin layers on the metal plate is visually observed to determine whether the resin forms a continuous and transparent film or the resin has a powdery form.

In this regard, the MFT of the resin is defined as the minimum temperature in a temperature range in which a continuous and transparent film of the resin is formed.

When the resin layer is dried at a temperature below the MFT, the resin does not form a continuous and transparent film, and has a (white) powdery form.

Specific examples of the marketed instrument for use in measuring the MFT include FILM FORMING TEMPERATURE TESTER manufactured by Imoto Machinery Co., Ltd., and MFT TESTER TP-801 manufactured by TESTER SANGYO CO., LTD.

In this application, the MFT of a resin is determined by using an aqueous dispersion liquid of the resin having a solid content of 30% by weight.

The difference between the MFT (lower MFT) of the resin A and the MFT (higher MFT) of the resin B is preferably not lower than 30° C. In order to enhance the effect, the MFT of the resin B is preferably not lower than 40° C. and lower than 200° C., and more preferably not lower than 50° C. and lower than 100° C., although the proper MFT of the resin B is determined depending on the property of the resin B and the weight ratio of the resin A to the resin B. The MFT of the resin A is preferably not higher than 30° C., and more preferably not higher than 0° C.

An organic solvent included in the ink (first ink and second ink) allows each of the resins A and B to easily form a film when the ink is dried. In addition, the resin B accelerates filming of the resin A. Therefore, when an image is formed on a recording medium using the inkjet ink (ink set) of this disclosure, it is not absolutely necessary to perform a process of heating the image.

The MFT difference mentioned above is more preferably not lower than 50° C. In this case, a good combination of adhesiveness with recording media and toughness can be imparted to the ink image.

Each of the first ink and the second ink can include plural resins. In this case, the MFT(A) of mixtures of the resins $A_1$ to An included in the first ink, and the MFT(B) of mixtures of the resins $B_1$ to Bn included in the second ink are measured to be compared with each other. In this ink set, the MFT(A) is preferably lower than the MFT(B).

The resins A and B are preferably particulate (granular) resins. The resins A and B may be synthesized resins or marketed resin products. Specific examples of such resins include urethane resins, polyester resins, acrylic resins, vinyl acetate resins, styrene resins, butadiene resins, styrene-butadiene resins, vinyl chloride resins, acrylic styrene resins, acrylic silicone resins, etc.

It is preferable that the resin A and the resin B are the same kind of resin so that the second layer formed by the second ink including the resin B has good adhesiveness with the first layer formed by the first ink including the resin A. Specifically, when the resin A and the resin B are the same kind of resin, the first layer formed on a recording medium hardly repels the second ink to be applied on the first layer to form the second layer on the first layer, and therefore the second layer has good adhesiveness with the first layer. In this case, the resultant image has good glossiness, and hardly causes such a problem that the image is cracked. In addition, in order to enhance the toughness of the print produced by the inkjet ink of this disclosure, urethane resins are preferably used for the resins A and B.

Specific examples of the marketed resin products for use in the ink of this disclosure include UCOAT UX-485 (polycarbonate urethane resin emulsion), UCOAT UWS-145 (polyester urethane resin emulsion), PERMARIN UA-368T (polycarbonate urethane resin emulsion), and PERMARIN UA-200 (polyether urethane resin emulsion), which are manufactured by Sanyo Chemical Industries, Ltd.; VONCOAT 5454 (styrene-acrylic resin emulsion), and VONCOAT 4001 (acrylic resin emulsion), which are manufactured by DIC Corporation; SAE-1014 (styrene-acrylic resin emulsion), which is manufactured by ZEON CORPORATION; SAIBINOL SK-200 (acrylic resin emulsion), which is manufactured by Saiden Chemical Industry Co., Ltd.; PRIMALs AC-22 and AC-61 (acrylic resin emulsion), which are manufactured by Dow Chemical Company (former Rohm & Haas); NANOCRYL (acrylic resin emulsion), which is manufactured by TOYOCHEM CO., LTD.; etc.

When a resin is dispersed in an aqueous medium to prepare a resin dispersion liquid for use in the ink of this disclosure, forcible-emulsification type resin emulsions prepared by using a dispersant can be used. However, since a film formed by such a forcible-emulsification type resin emulsion includes the dispersant, the strength of the film often deteriorates. Therefore, it is preferable to use a self-emulsifying type resin emulsion, in which an anionic group is included in the molecule of the resin, for the inkjet ink of this disclosure.

The acid value of the resin including such an anionic group is preferably from 5 to 100 mgKOH/mg so that the resin can be easily dispersed in water, and is more preferably from 5 to 50 mgKOH/mg so that the resin can impart a good combination of abrasion resistance and chemical resistance to the ink.

Specific examples of the anionic group include carboxyl group, carboxylate group, sulfonic acid group, sulfonate group, phosphate group, etc. Among these groups, carboxylate group and sulfonate group, which are partially or completely neutralized by a basic compound, are preferably used as the anionic group so that the resultant resin can be stably dispersed in water. In order to introduce such an anionic group into a resin, it is preferable to use a monomer having such an anionic group when the resin is prepared.

Specific examples of the basic compound for use in neutralizing the anionic group of the resin include ammonia; organic amines such as triethylamine, pyridine, and morpholine; alkanol amines such as monoethanolamine; basic compounds having an atom such as Na, K, Li and Ca; etc.

When a forcible-emulsification method is used for preparing the resin emulsion, any of nonionic surfactants and anionic surfactants can be used. However, nonionic surfactants are preferably used, because the resultant resin emulsion can impart good water resistance to the ink image.

Specific examples of such nonionic surfactants include polyoxyethylene alkyl ethers, polyoxyalkylene alkyl ethers, polyoxyethylene derivatives, polyoxyethylene fatty acid esters, polyoxyethylene polyalcohol fatty acid esters, polyoxyethylene polyoxypropylene polyols, polyoxyethylene sorbitan fatty acid esters, polyoxyethylene hydrogenated castor oils, polyoxyalkylene polycyclic phenyl ethers, polyoxyethylenealkylamines, alkylalkanolamides, polyalkylene glycol (meth)acrylate, etc. Among these, polyoxyethylene alkyl ethers, polyoxyethylene fatty acid esters, polyoxyethylene sorbitan fatty acid esters, and polyoxyethylenealkylamines are preferable.

Specific examples of the anionic surfactants for use in preparing a forcible-emulsification type resin emulsion include salts of alkylsulfuric acid esters, salts of polyoxyethylene alkyl ether sulfuric acids, salts of alkylbenzenesulfonic acids, salts of α-olefinsulfonic acids, salts of methyltauric acid, salts of sulfosuccinic acid, salts of ether sulfonic acids, salts of ether carboxylic acids, fatty acid salts, formalin condensates of naphthalene sulfonic acid, alkylamine salts, quaternary ammonium salts, alkyl betaines, alkylamine oxides, etc. Among these, salts of polyoxyethylene alkyl ether sulfuric acids, and salts of sulfosuccinic acid are preferable.

The added amount of such a surfactant is generally from 0.1 to 30% by weight, and preferably 5 to 20% by weight, based on the weight of the resin included in the ink. When the added amount is from 0.1 to 30% by weight, the resin emulsion has good film forming property, and therefore the resultant ink (ink image) can have a good combination of adhesiveness and water resistance. In addition, the print can be used even for outdoor application without causing a blocking problem such that when prints are stacked, the prints are adhered to each other, thereby forming a block of the prints.

Since the ink of this disclosure, which includes such a resin dispersion liquid (emulsion) as mentioned above, is typically used for inkjet recording apparatuses, the volume average particle diameter of the particulate resin in the ink is preferably from 10 nm to 1,000 nm, more preferably 10 nm to 200 nm, and even more preferably from 10 nm to 100 nm.

When the volume average particle diameter of the particulate resin is from 10 nm to 1,000 nm, the area of contact points of the particulate resin with the organic solvent included in the ink increases, and thereby the film forming property of the particulate resin can be enhanced. Therefore, the ink can form a continuous tough resin film in the image, and prints having good strength can be produced by the ink.

In this application, the volume average particle diameter of the resin in a resin dispersion liquid (emulsion) is measured with a particle analyzer such as MICROTRACK MODEL UPA 9340 from NIKKISO CO., LTD.

The ink can include two or more kinds of resins. In this case, the total amount of the resins in the ink is preferably from 1 to 10% by weight based on the total weight of the ink so that the ink can have a good combination of fixability (adhesiveness with recording media) and ink stability. In addition, the total amount is more preferably from 5 to 10% by weight, because the smoothness of the ink layer can be enhanced, and therefore the ink image can have high glossiness while having good adhesiveness with recording media.

The MFT of a resin dispersion liquid (emulsion) for use in the ink of this disclosure can be controlled, for example, by controlling the glass transition temperature (Tg) of the resin. When the resin is a copolymer, the MFT of the dispersion liquid (emulsion) of the copolymer can be adjusted by changing the ratio of the monomers constituting the copolymer.

The MFT of a resin dispersion liquid (emulsion) changes depending on the particle diameter of the particulate resin in the dispersion liquid (emulsion). Thus, it is possible to control the MFT of a resin dispersion liquid (emulsion) by controlling these factors.

<Urethane Resin>

As mentioned above, urethane resins are preferably used as the resin of the ink of this disclosure. The urethane resins are not particularly limited, and, for example, urethane resins prepared by reacting a polyol with a polyisocyanate can be used.

Suitable materials for use as the polyol include polyether polyols, polycarbonate polyols, and polyester polyols.

(Polyether Polyol)

Suitable materials for use as the polyether polyol include polyether polyols prepared by subjecting one or more compounds (i.e., starting material), which have two or more active hydrogen atoms, and an alkylene oxide to addition polymerization.

Specific examples of the starting material include ethylene glycol, diethylene glycol, triethylene glycol, propylene glycol, trimethylene glycol, 1,3-butanediol, 1,4-butanediol, 1,6-hexanediol, glycerin, trimethylol ethane, trimethylol propane, etc.

Specific examples of the alkylene oxide include ethylene oxide, propylene oxide, butylene oxide, styrene oxide, epichlorohydrin, tetrahydrofuran, etc.

Among various polyether polyols, polyoxytetramethylene glycol and polyoxypropylene glycol are preferable because an inkjet ink including a resin prepared by using the compounds can produce a print having excellent abrasion resistance.

As mentioned above, polycarbonate urethane resins are preferably used as the resin B. In this regard, polycarbonate polyols are preferably used for preparing such polycarbonate urethane resins. Such polycarbonate polyols can be prepared by reacting a carbonic acid ester with a polyol, or by reacting phosgene with bisphenol A.

(Polycarbonate Polyol)

Specific examples of the carbonic acid ester mentioned above for use in preparing polycarbonate polyols include methyl carbonate, dimethyl carbonate, ethyl carbonate, diethyl carbonate, cyclocarbonate, diphenyl carbonate, etc.

Specific examples of the polyol capable of reacting with such a carbonic acid ester include dihydroxy compounds having a relatively low molecular weight such as ethylene glycol, diethylene glycol, triethylene glycol, 1,2-propylene glycol, 1,3-propylene glycol, dipropylene glycol, 1,4-butanediol, 1,3-butanediol, 1,2-butanediol, 2,3-butanediol, 1,5-pentanediol, 1,5-hexanediol, 2,5-hexanediol, 1,6-hexanediol, 1,7-pentanediol, 1,8-octanediol, 1,9-nonanediol, 1,10-decanediol, 1,11-undecanediol, 1,12-dodecanediol, 1,4-cyclohexanediol, 1,4-cyclohexanedimethanol, hydroquinone, resorcin, bisphenol A, bisphenol F, and 4,4'-biphenol; polyether polyols such as polyethylene glycol, polypropylene glycol, and polyoxytetramethylene glycol; polyester polyols such as polyhexamethylene adipate, polyhexamethylene succinate, and polycaprolactone; etc.

(Polyester Polyol)

Suitable materials for use as the polyester polyol include polyester polyols prepared by subjecting a polyol, which has a low molecular weight, and a polycarboxylic acid to an ester reaction; polyester polyols prepared by subjecting a cyclic ester such as ε-caprolactone to a ring opening polymerization reaction; and copolymers of these polyester polyols.

Specific examples of the low molecular weight polyol mentioned above include ethylene glycol, propylene glycol, etc.

Specific examples of the polycarboxylic acid mentioned above include succinic acid, adipic acid, sebacic acid, dodecanedicarboxylic acid, terephthalic acid, isophthalic acid, phthalic acid, and anhydrides or ester-formable derivatives of these polycarboxylic acids.

(Polyisocyanate)

Specific examples of the polyisocyanate for use in preparing the urethane resin mentioned above include aromatic diisocyanates such as phenylene diisocyanate, tolylene diisocyanate, diphenylmethane diisocyanate, xylylene diisocyanate, tetramethylxylylene diisocyanate, and naphthalene diisocyanate; aliphatic or alicyclic diisocyanates such as hexamethylene diisocyanate, lysine diisocyanate, cyclohexane diisocyanate, isophorone diisocyanate, dicyclohexylmethane diisocyanate, and 2,2,4-trimethylhexamethylene diisocyanate; etc. These diisocyanates can be used alone or in combination.

By using at least one alicyclic diisocyanate for preparing the urethane resin, the strength of the film formed by the urethane resin can be enhanced. This is because shrinkage of the resin can be prevented when the resin is heated to be crosslinked, thereby preventing occurrence of a problem in that the ink image on a print deteriorates (e.g., cracks are formed). Since one of the objects of the inkjet ink of this disclosure is to produce prints for outdoor application (such as posters and signboards), the ink images on the prints have to have good weather resistance over a long period of time. Therefore, it is preferable to use a urethane resin prepared by using at least one alicyclic diisocyanate for the inkjet ink.

In order to produce images having good weather resistance, it is preferable to use isophorone diisocyanate or dicyclohexylmethane diisocyanate. In this regard, the ratio of an alicyclic diisocyanate is preferably not less than 60% by weight based on the total weight of the isocyanate compounds used for preparing the urethane resin.

(Preparation Method of Particulate Urethane Resin)

The method for preparing a particulate urethane resin for use in the ink of this disclosure is not particularly limited, and conventional methods can be used. For example, the following method can be used.

Initially, in the presence or absence of an organic solvent, such a polyol and a polyisocyanate as mentioned above are reacted, wherein the equivalence ratio of [NCO]/[OH] is greater than 1. Thus, a urethane polymer having an isocyanate group at the end thereof is prepared.

After the anionic groups of the urethane polymer are neutralized if necessary by using such a basic compound (neutralizer) as mentioned above, the polymer is reacted with a polymer chain growing agent, and then the organic solvent is removed from the reaction system if necessary.

Specific examples of the organic solvent used for the method include ketones such as acetone and methyl ethyl ketone; ethers such as tetrahydrofuran and dioxane; acetic acid esters such as ethyl acetate and butyl acetate; nitriles such as acetonitrile; amides such as dimethylformamide, N-methyl pyrrolidone, and N-ethyl pyrrolidone; etc. These organic solvents can be used alone or in combination.

Polyamines and compounds having an active hydrogen atom can be used as the polymer chain growing agent.

Specific examples of such polyamines include diamines such as ethylenediamine, 1,2-propanediamine, 1,6-hexamethylenediamine, piperazine, 2,5-dimethylpiperazine, isophoronediamine, 4,4'-dicyclohexylmethanediamine and 1,4-cyclohexanediamine; polyamines such as diethylenetriamine, dipropylenetriamine and triethylenetetramine; hydrazines such as hydrazine, N,N'-dimethylhydrazine and 1,6-hexamethylenebishydrazine; hydrazides such as succinic dihydrazide, adipic dihydrazide, glutaric dihydrazide, sebacic dihydrazide, and isophthalic dihydrazide; etc.

Specific examples of the compounds having an active hydrogen atom include glycols such as ethylene glycol, diethylene glycol, triethylene glycol, propylene glycol, 1,3-propanediol, 1,3-butanediol, 1,4-butanediol, hexamethylene glycol, saccharose, methylene glycol, glycerin and sorbitol; phenolic compounds such as bisphenol A, 4,4'-dihydroxybiphenyl, 4,4'-dihydroxydiphenyl ether, 4,4'-dihydroxydiphenyl sulfone, hydrogenated bisphenol A, and hydroquinone; water; etc. These can be used alone or in combination in an amount such that the preservation stability of the resultant ink does not deteriorate.

The preferred methods of adding and dispersing such a urethane resin are the same as those mentioned above in paragraph 1. In addition, the average particle diameter of particles of the resin and the acid value of the resin are also mentioned above in paragraph 1.

It is preferable that an image of the inkjet ink of this disclosure recorded on a recording medium is heated so that the amount of residual solvents decreases, and thereby the adhesiveness of the image with the recording medium is enhanced. Particularly, when the MFT of the resin B is higher than 80° C., such heating is preferably performed to prevent occurrence of a problem in that the resin in the image forms a defective film. In this case, the toughness of the image can be further enhanced.

The resin B included in the inkjet ink of this disclosure preferably has a property such that the film formed by the resin B has a surface hardness of not less than 100 N/mm$^2$. In this case, the ink can form a tough film, and therefore better abrasion resistance can be imparted to the ink image.

The upper limit of the surface hardness of the film formed by the resin B is 250 N/mm$^2$, so that flexibility of the print does not deteriorate.

In this application, the surface hardness of a resin film is measured by the following method.

Specifically, an emulsion of the resin B is applied on a slide glass so that the film has a thickness of 10 μm, followed by drying the resin emulsion for 30 minutes at 100° C. to form a resin film. The surface hardness (i.e., Martens' hardness described in ISO 14577-2002) of the thus prepared resin film is measured with a micro surface hardness tester (FISCHER SCOPE HM2000 from Fischer Instruments K.K.). Specifically, a Berkovich indenter of the instrument is set on the resin film, and a load of 9.8 mN is applied to the indenter to measure the depth of the indenter digging into the resin film, resulting in determination of the Martens' hardness of the resin film.

The inkjet ink of this disclosure can include a resin other than the resins A and B. However, in order that the effect of this disclosure can be satisfactorily produced, the amount of each of the resins A and B in the first or second ink is preferably not less than 70% by weight, and more preferably not less than 90% by weight, based on the total weight of the resin components included in the first or second ink.

Next, other constituents of the inkjet ink of this disclosure will be described.

The ink of this disclosure includes at least water, a colorant, a resin, and an aqueous organic solvent. In addition, the ink can optionally include other components such as surfactants, antiseptic/anti-mildew agents, antirusts, pH controlling agents, and antioxidants for rubbers and plastics (such as hindered phenols and hindered phenol amines), which are preferably colorless.

2. Colorant

When the first ink or the second ink is a white ink, any known components (such as white colorants) for use in conventional white inkjet inks can be used therefor. Specific examples of such white colorants include white inorganic or organic pigments, and particulate white hollow resins.

Specific examples of the white inorganic pigments include sulfates of alkali earth metals such as barium sulfate; carbonates of alkali earth metals such as calcium carbonate; silicas such as particulate silica and synthesized silicates; calcium silicate, aluminum hydroxide, alumina, hydrated alumina, titanium oxide, zinc oxide, talc and clay. However, the white colorant is not limited thereto, and other white colorants having a whiteness which is not less than those of these white pigments can also be used. Among these white colorants, titanium oxide and particulate hollow resins are preferable.

In this application, the whiteness is measured by the method described in ISO-2469 (i.e., JIS-8148), and white colorants having a whiteness of not less than 70 are preferably used for the white ink of this disclosure.

The inkjet ink (the first and/or second ink) of this disclosure is also used as a non-white ink such as color inks, black inks, and grey inks. Specific examples of such color inks include cyan inks, magenta inks, yellow inks, light cyan inks, light magenta inks, red inks, green inks, blue inks, etc. These color inks can be used alone or in combination.

Any known components (such as non-white colorants) for use in conventional non-white inkjet inks can be used for the non-white ink of this disclosure.

Specific examples of non-white colorants for use in the non-white ink of this disclosure include non-white inorganic or organic pigments.

Specific examples of the non-white inorganic pigments include iron oxide, barium yellow, cadmium red, chrome yellow, and carbon blacks which are prepared by any known method such as contact methods, furnace methods, and thermal methods.

Specific examples of the non-white organic pigments include azo pigments (azo lakes, insoluble azo pigments, condensed azo pigments, and chelated azo pigments are also included therein); polycyclic pigments (e.g., phthalocyanine pigments, perylene pigments, perynone pigments, anthraquinone pigments, quinacridone pigments, dioxazine pigments, indigo pigments, thioindigo pigments, isoindolinone pigments, and quinophthalone pigments); chelated dyes (e.g., basic chelated dyes and acidic chelated dyes; nitro pigments, nitroso pigments, aniline black, etc.

Among these colorants, colorants having good affinity for the solvent used for the ink are preferably used.

The added amount of a pigment serving as the colorant is preferably from 0.1 to 10% by weight, and more preferably from 1 to 10% by weight, based on the total weight of the ink composition.

In general, as the content of a pigment in the ink increases, the image density of images recorded by the ink increases, but the fixability of the ink and the reliability of the ink (such as ejection stability of the ink and ability of preventing occurrence of a clogging problem in that inkjet nozzles are clogged with the ink) tends to deteriorate. Therefore, it is preferable to control the pigment content so as to fall in the range mentioned above.

Specific examples of black colorants for use in the non-white ink of this disclosure include inorganic black pigments such as carbon blacks (i.e., C.I. Pigment Black 7), e.g., furnace blacks, lamp blacks, acetylene blacks, and channel blacks; and metals and metal compounds such as copper, iron (i.e., C.I. Pigment Black 11), and titanium oxide; organic black pigments such as Aniline Black (C.I. Pigment Black 1); etc.

Specific examples of non-white colorants for use in the non-white ink of this disclosure include C.I. Pigment Yellows 1, 3, 12, 13, 14, 17, 24, 34, 35, 37, 42 (yellow iron oxide), 53, 55, 74, 81, 83, 95, 97, 98, 100, 101, 104, 108, 109, 110, 117, 120, 138, 150, 153 and 155; C.I. Pigment Oranges 5, 13, 16, 17, 36, 43 and 51; C.I. Pigment Reds 1, 2, 3, 5, 17, 22, 23, 31, 38, 48:2, 48:2 (PERMANENT RED 2B(Ca)), 48:3, 48:4, 49:1, 52:2, 53:1, 57:1 (Brilliant Carmine 6B), 60:1, 63:1, 63:2, 64:1, 81, 83, 88, 101 (red iron oxide), 104, 105, 106, 108 (cadmium red), 112, 114, 122 (Quinacridone Magenta), 123, 146, 149, 166, 168, 170, 172, 177, 178, 179, 185, 190, 193, 209 and 219; C.I. Pigment Violets 1 (Rhodamine Lake), 3, 5:1, 16, 19, 23 and 38; C.I. Pigment Blues 1, 2, 15 (Phthalocyanine Blue), 15:1, 15:2, 15:3 (Phthalocyanine Blue), 16, 17:1, 56, 60 and 63; C.I. Pigment Greens 1, 4, 7, 8, 10, 17, 18 and 36; etc.

In addition, self-dispersion type pigments in which a functional group such as sulfonic group and carboxyl group is attached to the surface of a pigment (such as carbon black) and which can be dispersed in water can also be used as the colorant.

Further, microencapsulated pigments in which a pigment is microencapsulated so that the pigment can be dispersed in water can also be used as the colorant.

These pigments are synonymous with resin particles including a pigment. In this regard, it is not absolutely necessary that all the particles of a pigment dispersed in the ink are covered with the resin or the resin adsorbs on all the particles of the pigment as long as the effect of this application can be produced.

The particle diameter of a pigment for use in the ink of this disclosure is not particularly limited, but it is preferable to use a pigment having a Mean Number Diameter (MN) in a range of from 20 nm to 150 nm.

When a pigment having a Mean Number Diameter of not greater than 150 nm is used, the pigment can be stably dispersed in the ink. Therefore, the ink has good ejection stability, and can produce high quality ink images.

Although inks including a pigment having a Mean Number Diameter of less than 20 nm have a good combination of preservability and ejection stability, it is not economical to disperse a pigment so as to have a particle diameter of less than 20 nm in the ink, because the dispersing operation and the classification operation performed on the pigment become complex.

When a pigment is dispersed in the ink using a dispersant, any known dispersants such as polymer dispersants and water soluble surfactants can be used as the dispersant.

<Particulate Hollow Resin>

Not only titanium oxide but also particulate hollow resins can be used as a white colorant of the white ink of this disclosure. Such particulate hollow resins have a hollow inside thereof, and the shell of the particulate hollow resins is made of a resin having a good liquid permeability. Therefore, when such a particulate hollow resin is present in an ink including an aqueous medium, the hollow is filled with the aqueous medium of the ink. Since a particulate hollow resin whose hollow is filled with an aqueous medium has almost the same specific gravity as that of the aqueous medium, the particulate hollow resin is stably dispersed in the ink without precipitating in the ink. Therefore, the white ink has a good combination of storage stability and ejection stability.

When an ink image is formed on a recording medium using an ink including a particulate hollow resin, the aqueous medium present inside the hollows of the particulate hollow resin escapes therefrom when the ink image is dried, resulting in formation of hollows in the particulate resin (i.e., replacement of the aqueous medium in the hollows with air).

In this case, since the particulate hollow resin has a resin layer and an air layer, which have different refractive indexes, the particulate hollow resin effectively scatters incident light, and therefore the ink image looks white.

The particulate hollow resin for use in the white ink of this disclosure is not particularly limited, and any known particulate hollow resins can be used. Specific examples of the particulate hollow resin include those disclosed in U.S. Pat. No. 4,880,465, and Japanese Patent No. 3,562,754, incorporated herein by reference The average particle diameter (outer diameter) of such a particulate hollow resin for use in the ink of this disclosure is preferably from 0.2 µm to 1.0 µm, and more preferably from 0.4 µm to 0.8 µm. When the average particle diameter is not greater than 1.0 µm, precipitation of the particulate hollow resin in the ink can be prevented (i.e., the particulate hollow resin has good dispersion stability in the ink), and in addition occurrence of the nozzle clogging problem in that nozzles of an inkjet printer are clogged with an ink, thereby forming defective images can be prevented (i.e., the reliability of the ink can be enhanced). When the average particle diameter is not less than 0.2 µm, the resultant white images have satisfactory whiteness.

The inner diameter of the particulate hollow resin is preferably from 0.1 µm to 0.8 µm.

The average particle diameter of such a particulate hollow resin can be measured a particle diameter distribution measuring instrument using a laser diffraction/scattering method such as MICROTRACK UPA series from NIKKISO CO., LTD, which uses a dynamic light scattering method.

The content (solid content) of such a particulate hollow resin in the ink is preferably from 5 to 20% by weight, and more preferably from 8 to 15% by weight, based on the total weight of the ink composition. When the solid content is not greater than 20% by weight, occurrence of the nozzle clogging problem can be prevented (i.e., the reliability of the ink can be enhanced). When the solid content is not less than 5% by weight, the resultant white images have satisfactory whiteness.

The method for preparing such a particulate hollow resin is not particularly limited, and any known methods can be used. For example, emulsion polymerization methods in which a vinyl monomer, a surfactant, a polymerization initiator, and an aqueous medium are heated while agitated in a nitrogen atmosphere to prepare an emulsion of a particulate hollow resin can be used.

Suitable materials for use as the vinyl monomer include unsaturated nonionic monoethylenic monomers. Specific examples of such monoethylenic monomers include styrene, vinyl toluene, ethylene, vinyl acetate, vinyl chloride, vinylidene chloride, acrylonitrile, (meth)acrylamide, (meth)acrylates, etc. Specific examples of the (meth)acrylates include methyl acrylate, methyl methacrylate, ethyl acrylate, ethyl methacrylate, butyl acrylate, butyl methacrylate, 2-hydroxyethyl methacrylate, 2-ethylhexyl acrylate, 2-ethylhexyl methacrylate, benzyl acrylate, benzyl methacrylate, lauryl acrylate, lauryl methacrylate, oleyl acrylate, oleyl methacrylate, palmityl acrylate, palmityl methacrylate, stearyl acrylate, and stearyl methacrylate.

Difunctional vinyl monomers can also be used as the vinyl monomer. Specific examples of such difunctional vinyl monomers include divinyl benzene, allyl methacrylate, ethylene glycol dimethacrylate, 1,3-butanediol dimethacrylate, diethylene glycol dimethacrylate, trimethylolpropane trimethacrylate, etc. By copolymerizing and highly cross-linking such a monofunctional vinyl monomer as mentioned above with such a difunctional vinyl monomer, a particulate hollow resin having a good combination of light scattering property, heat resistance, solvent resistance, and dispersibility in solvents can be produced.

3. Organic Solvent

The organic solvent included in the inkjet ink of this disclosure is not particularly limited, but is preferably a water soluble organic solvent. Specific examples of the organic solvent include polyalcohols such as ethylene glycol, diethylene glycol, 1,2-propanediol, 1,3-propanediol, 1,2-butanediol, 1,3-butanediol, 2,3-butanediol, 3-methyl-1, 3-butanediol, triethylene glycol, polyethylene glycol, polypropylene glycol, 1,5-pentanediol, 1,6-hexanediol, glycerin, 1,2,6-hexanetriol, 2-ethyl-1,3-hexanediol, ethyl-1,2,4-butanetriol, 1,2,3-butanetriol and petriol; alkyl ethers of polyalcohols such as ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, and propylene glycol monoethyl ether; aryl ethers of polyalcohols such as ethylene glycol monophenyl ether, and ethylene glycol monobenzyl ether; nitrogen-containing heterocyclic compounds such as 2-pyrrolidone, N-methyl-2-pyrrolidone, N-hydroxyethyl-2-pyrrolidone, 1,3-dimethylimidazolidinone, ϵ-caprolactam and ϵ-butyrolactone; amides such as formamide, N-methylformamide and N,N-dimethylformamide; amines such as monoethanolamine, diethanolamine and triethanolamine; sulfur-containing compounds such as dimethylsulfoxide, sulfolane and thiodiethanol; propylene carbonate, ethylene carbonate, etc.

These can be used alone or in combination.

In order to accelerate filming of the resin and to prevent aggregation of particles in the ink, 1,2-propanediol, 1,3-propanediol, 1,2-butanediol, 1,3-butanediol and 2,3-butanediol are preferably used. In this case, ink images recorded by the ink have high glossiness.

The content of such an organic solvent in the ink is not particularly limited, but is preferably from 20 to 70% by weight, and more preferably from 30 to 60% by weight, based on the total weight of the ink. By controlling the content of an organic solvent in the range, the resultant ink can have a good combination of drying property and ejection stability.

4. Surfactant

The inkjet ink of this disclosure can include a surfactant so that recording media can be satisfactorily wet with the ink.

The added amount of such a surfactant in the ink is preferably from 0.1 to 5% by weight based on the total weight of the ink. When the added amount is not less than 0.1% by weight, recording media can be satisfactorily wet with the ink even when the recording media are non-porous recording media, thereby enhancing the quality of images formed on such non-porous recording media. In addition, when the added amount is not greater than 5% by weight, the ink hardly foams, and therefore the ink has good ejection stability.

The surfactant for use in the ink of this disclosure is not particularly limited as long as the added amount of the surfactant falls in the range mentioned above, and any ampholytic surfactants, nonionic surfactants, and anionic surfactants can be used.

Among various surfactants, nonionic surfactants such as polyoxyethylene alkylphenyl ethers, polyoxyethylene alkyl esters, polyoxyethylenealkylamines, polyoxyethylenealkylamides, polyoxyethylene-propylene block copolymers, fatty acid esters of sorbitan, fatty acid esters of polyoxyethylene sorbitan, and ethylene oxide adducts of acetylene alcohol are preferable because the colorant included in the ink can be well dispersed and thereby ink images having good image quality can be produced.

Depending on the formula of the ink, fluorine-containing surfactants and silicone-based surfactants can be used alone or in combination with the above-mentioned surfactants.

5. Other Additives

In addition to the constituents mentioned above, the ink can optionally include one or more of other additives such as antiseptic/anti-mildew agents, antirusts and pH controlling agents.

Specific examples of the antiseptic/anti-mildew agents include 1,2-benzisothiazoline-3-one, sodium benzoate, sodium dehydroacetate, sodium sorbate, sodium pentachlorophenol, sodium salt of 2-pyridinethiol-1-oxide, etc.

Specific examples of the antirusts include acidic sulfites, sodium thiosulfate, ammonium thioglycolate, diisopropylammonium nitrite, pentaerythritol tetranitrate, dicyclohexylammonium nitrite, etc.

Any known pH controlling agents can be used as long as the agents can control the pH of the ink in a preferable range without adversely affecting the property of the ink. Specific examples of such pH controlling agents include hydroxides of alkali metals such as lithium hydroxide, sodium hydroxide, and potassium hydroxide; carbonates of alkali metals such as lithium carbonate, sodium carbonate, an potassium carbonate; quaternary ammonium hydroxides; amines such as diethanol amine, and triethanol amine; ammonium hydroxide; quaternary phosphonium hydroxides; etc.

The inkjet ink of this disclosure is typically prepared by dispersing or dissolving such constituents as mentioned above in an aqueous medium while mixing the constituents. The mixture is stirred if necessary using a stirrer (e.g., stirrers using a stirrer blade), or a disperser such as magnetic stirrers and high speed dispersers.

The ink of this disclosure can be used for any inkjet printers having an inkjet recording head. Specific examples of such printers include the following:

(1) Piezoelectric inkjet printers (such as a printer disclosed by JP-H02-51734-A), in which a piezoelectric element is used as a pressure generating device to press an ink in an ink passage, and a vibrating plate serving as a wall of the ink passage is deformed by the piezoelectric element to change the volume of the ink passage to eject ink droplets from the ink passage, thereby forming an ink image on a recording medium;

(2) Thermal inkjet printers (such as a printer disclosed by JP-S61-59911-A), in which an ink in an ink passage is heated by heating a resistor to form an air bubble in the ink passage, thereby ejecting ink droplets from the ink passage, resulting in formation of an ink image on a recording medium; and (3) Electrostatic inkjet printers (such as a printer disclosed by JP-H06-71882-A), in which an electrostatic force is formed between a vibrating plate serving as a wall of an ink passage and an electrode opposed to the vibrating plate to deform the vibrating plate and to change the volume of the ink passage, thereby ejecting ink droplets from the ink passage, resulting in formation of an ink image on a recording medium.

Among these inkjet printers, the ink of this disclosure can be preferably used for the piezoelectric inkjet printers.

Next, the recording medium on which an image of the ink of this disclosure is to be formed will be described.

The ink set of this disclosure can provide prints having a good combination of adhesiveness with recording medium and abrasion resistance even when a non-porous material is used as the recording medium. Among various non-porous materials for use as the recording medium, films of plastics such as vinyl chloride resins, polyethylene terephthalate (PET), and polycarbonate are preferably used. However, even when the ink of this disclosure is used for other non-porous recording media, and porous materials such as plain papers and porous materials coated with an inorganic material, which have been conventionally used as recording media, the ink can provide good performance.

Although the ink of this disclosure can form high quality images on such non-porous recording media as mentioned above, it is preferable to heat the recording media after printing in order that higher quality images having a good combination of adhesiveness with recording medium and abrasion resistance can be produced thereon and high speed printing can be performed.

Any known heating devices can be used as the heating device to heat the recording medium after printing. Specific examples of the heating device include forced air heaters, radiation heaters, conduction heaters, high frequency driers, microwave driers, etc. These can be used alone or in combination.

The heating temperature in the heating operation is determined depending on factors such as the property and added amount of the aqueous medium included in the ink, the MFT of the polycarbonate urethane resin emulsion included in the ink, and the property of the recording medium used. In this regard, in order to rapidly dry the print or to form a good film of the ink, the heating temperature is preferably as high as possible. However, when the heating temperature is too high, problems such that the recording medium used is damaged; and the inkjet recording head is heated and thereby the ink is defectively ejected tend to be caused. Therefore, it is preferable to adjust the heating temperature to prevent occurrence of the problems. The heating temperature is preferably from 40 to 120° C., and more preferably from 50 to 90° C.

Next, an inkjet printer capable of performing inkjet recording using the ink of this disclosure will be described by reference to FIGS. 1 and 2. Hereinafter, a case in which a paper is used as the recording medium will be described, but other porous recording media and non-porous recording media can also be used as the recording medium. In addition, the ink of this disclosure can be used for inkjet printers such as serial (shuttle type) inkjet printers in which a carriage performs scanning to form an ink image, and line inkjet printers which use a line inkjet recording head.

FIG. 1 is a schematic view illustrating an example of the serial inkjet printer for use in the inkjet recording method of this disclosure, which uses the ink of this disclosure.

The inkjet printer illustrated in FIG. 1 includes a main body 101 thereof, a sheet feeding tray 102, which is attached to the main body 101 and on which a stack of recording sheets is to be set, a sheet ejection tray 103, which is attached to the main body 101 and on which sheets of a recording medium bearing ink images thereon are stacked, and an ink cartridge setting portion 104 to which ink cartridges 201 are detachably attached. On the upper surface of the ink cartridge setting portion 104, an operating portion 105 including operation keys, a display, etc. is arranged. The ink cartridge setting portion 104 has a front cover 115 which is openable and closable so that the ink cartridges 201 can be attached to or detached from the ink cartridge setting portion 104. Numerals 111 and 112 respectively denote an upper cover of the inkjet printer, and a front cover of the printer.

Figure 2:
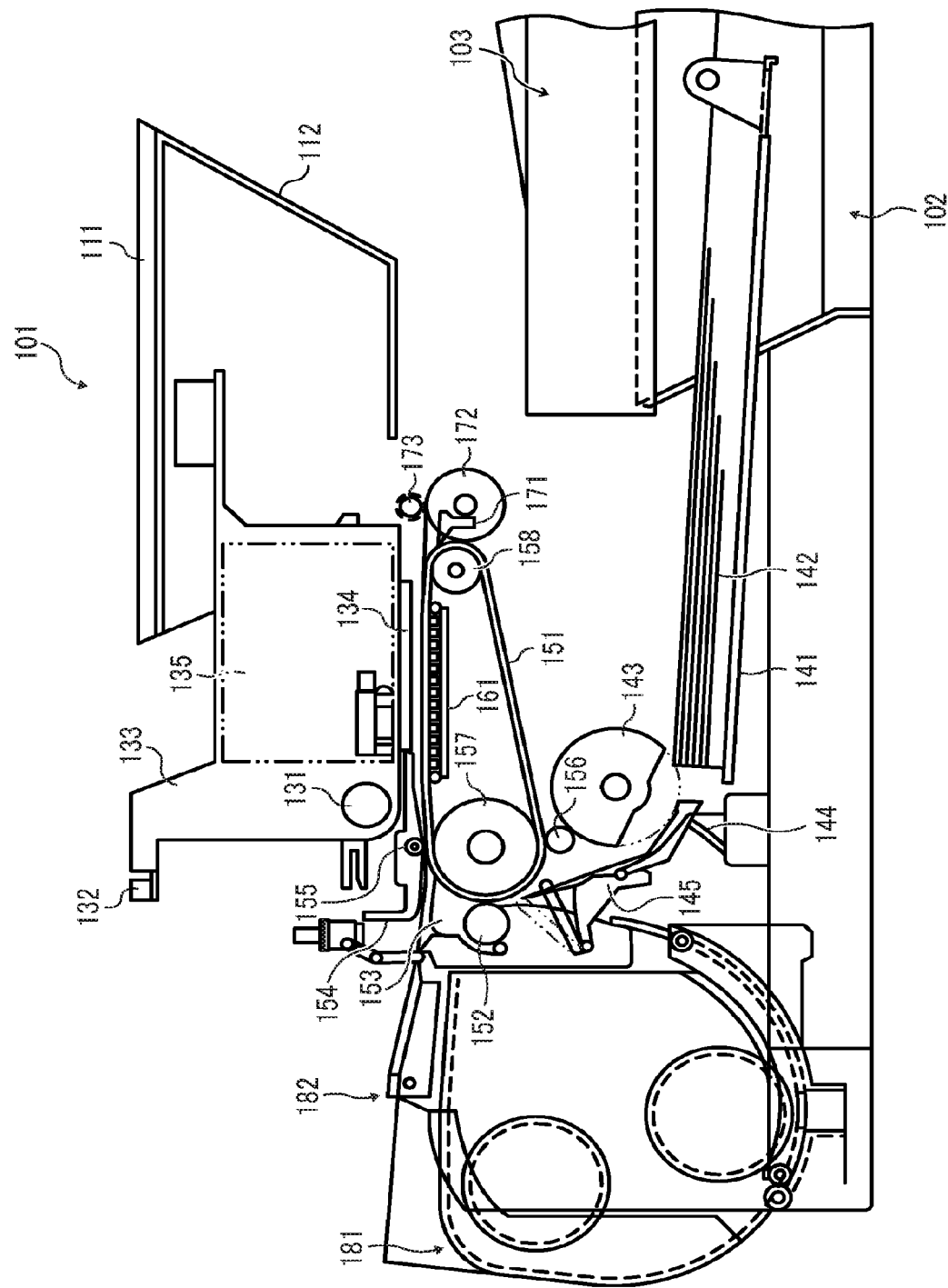
FIG. 2 is a sectional view illustrating the inside of the serial inkjet printer.

As illustrated in FIGS. 1 and 2, a carriage 133 is slidably supported by a guide rod 131 and a stay 132, which are supported by both side plates (not shown) of the main body 101, so that the carriage 133 can be moved in a main scanning direction by a main scanning motor (not shown) to perform a scanning operation (i.e., an image forming operation).

An inkjet recording head 134 including four inkjet recording heads, each of which has multiple nozzles arranged in a direction perpendicular to the main scanning direction to eject droplets of the first and second inks such as yellow (Y), magenta (M), cyan (C), black (K), white and clear inkjet inks downward, is provided on the carriage 133.

Each of the four inkjet recording heads 134 includes an energy generator to eject ink droplets using an energy such as heat energy and mechanical energy. Specific examples of the energy generator include, but are not limited thereto, piezoelectric actuators (e.g., piezoelectric devices), thermal actuators to eject ink droplets utilizing phase change of liquid caused by film boiling of a liquid using an electrothermal device such as a resistor, shape memory alloy actuators utilizing phase change of metal caused by temperature change, and electrostatic actuators utilizing electrostatic force.

In addition, sub-tanks 135 containing the inkjet inks to supply the inkjet inks to the corresponding recording heads 134 are provided on the carriage 133. The inkjet inks in the ink cartridges 201 set to the ink cartridge setting portion 104 are supplied to the corresponding sub-tanks 135 via corresponding ink supplying tubes (not shown).

The inkjet printer includes a sheet feeder to feed sheets of a recording medium 142 set on a sheet loading portion (pressing plate) 141. The sheet feeder includes a sheet feeding roller 143 to feed the recording medium sheets 142, and a separation pad 144, which faces the sheet feeding roller 143 while being biased toward the sheet feeding roller 143 and which is made of a material having a high friction coefficient, to feed the recording medium sheets 142 one by one from the sheet loading portion 141.

The inkjet printer further includes a feeder to feed the recording medium sheet 142, which is fed from the recording medium supplier, toward the image recording area located below the inkjet recording head 134. The feeder includes a conveying belt 151 to convey the recording medium sheet 142 while electrostatically attracting the recording medium sheet, a counter roller 152 to feed the recording medium sheet 142, which is fed from the sheet feeder along a guide 145, while sandwiching the recording medium sheet 142 with the conveying belt 151, a conveying guide 153 to change the direction of the recording medium sheet 142, which is fed substantially vertically, at an angle of about 90° so that the recording medium sheet 142 is contacted with the conveying belt 151 so as to be conveyed thereby, a pressing roller 155 which is biased toward the conveying belt 151 by a pressing member 154, and a charging roller 156 to charge the surface of the conveying belt 151.

The conveying belt 151 is an endless belt, which is tightly stretched by a conveying roller 157, which includes a heater therein, and a tension roller 158 so as to be rotated in a belt conveying direction (i.e., recording medium feeding direction, namely, a sub-scanning direction perpendicular to the main scanning direction). For example, the conveying belt 151 includes a surface layer (i.e., an uppermost layer), which electrostatically attracts the recording medium sheet 142 and which is a resin layer (made of a material such as a tetrafluoroethylene-ethylene copolymer (ETFE) whose electric resistance is not controlled) with a thickness of about 40 μm, and a back layer (i.e., a medium resistance layer or a grounding layer), which is made of almost the same material as that of the surface layer except that carbon black is included therein so that the back layer has a medium electric resistance.

In addition, a guide member 161, which has a heater therein, is arranged below the conveying belt 151 so as to face the image recording area in which an image is recorded on the recording medium sheet 142 by the inkjet recording head 134.

The inkjet printer further includes a sheet ejector to eject the recording medium sheet 142, which bears thereon an image recorded by the inkjet recording head 134, from the main body 101. The sheet ejector includes a separation claw 171 to separate the recording medium sheet 142 from the conveying belt 151, and sheet ejecting rollers 172 and 173 to eject the recording medium sheet 142 toward the sheet ejection tray 103 located below the sheet ejecting roller 172.

A duplex-printing sheet feeding unit 181 is detachably attached to the backside of the main body 101 of the inkjet printer. The duplex-printing sheet feeding unit 181 receives the recording medium sheet 142, which is fed to the duplex-printing sheet feeding unit 181 by reversely rotating the conveying belt 151, and feeds again the recording medium sheet 142 to the nip between the counter roller 152 and the conveying belt 151 so that another image is formed on the backside of the recording medium sheet 142 by the inkjet recording heads 134 in the image recording area.

A manual sheet feeder 182, by which a recording medium sheet can be manually fed to the inkjet printer, is provided above the duplex-printing sheet feeding unit 181.

In this inkjet printer, the recording medium sheets 142 are fed one by one from the sheet feeder while separated so as to be fed substantially vertically. The thus vertically fed recording medium sheet 142 is guided by the guide 145, and then fed by the conveying belt 151 and the counter roller 152 while sandwiched thereby. In addition, the recording medium sheet 142 is pressed toward the conveying belt 151 by the pressing roller 155 while the tip of the recording medium sheet 142 is guided by the conveying guide 153 so that the feeding direction of the recording medium sheet 142 is changed at an angle of about 90°. In this case, the conveying belt 151 is charged by the charging roller 156, and therefore the recording medium sheet 142 is fed by the conveying belt 151 while electrostatically attracted by the conveying belt 151.

Meanwhile, the carriage 133 is moved horizontally while the inkjet recoding head 134 is driven according to image signals to eject droplets of the inkjet inks toward the recording medium sheet 142, which is stopped in the image recording area, thereby forming one line image on the recording medium sheet 142. After the recording medium sheet 142 is fed in the sub-scanning direction with a predetermined length, the one-line image forming operation is performed again. By repeating the recording medium feeding operation and the one-line image forming operation, an ink image is formed on the recording medium sheet 142. The recording medium sheet 142 is then ejected to the sheet ejection tray 103.

Next, the inkjet recording method of this disclosure will be described.

The inkjet recording method uses the inkjet ink set of this disclosure, and includes a step of forming a first layer on a recording medium using the first ink (i.e., ejecting droplets of the first ink by applying at least one of heat energy and mechanical energy to the first ink to form a first layer), and a step of forming a second layer using the second ink (i.e., ejecting droplets of the second ink by applying at least one of heat energy and mechanical energy to the second ink to form a second layer on the first layer). For example, the following inkjet recording methods can be used, but the inkjet recording method of this disclosure is not limited thereto.

Specifically, in one example of the inkjet recording method, a transparent recording medium such as films is used, a white ink is used as the first ink to form the first layer, and a non-white ink is used as the second ink to form the second layer on the first layer.

In another example of the inkjet recording method, a transparent recording medium such as films is used, a clear ink is used as the first ink to form the first layer, and a non-white ink is used as the second ink to form the second layer on the first layer.

In another example of the inkjet recording method, a transparent recording medium such as films is used, a non-white ink is used as the first ink to form the first layer, and a white ink is used as the second ink to form the second layer on the first layer.

In another example of the inkjet recording method, a transparent recording medium such as films is used, a non-white ink is used as the first ink to form the first layer, and a transparent ink is used as the second ink to form the second layer on the first layer.

Having generally described this invention, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

Resin Emulsion Preparation Examples 1-9

(1) Preparation of Polycarbonate Urethane Resin Emulsion 1

The following compounds were fed into a reaction vessel, which is equipped with an agitator, a reflux condenser, and a thermometer, under a nitrogen gas flow.

| | |
|---|---|
| Polycarbonatediol (Reaction product of 1,6-hexanediol and dimethyl carbonate having a number average molecular weight (Mn) of 1,200) | 1,500 g |
| 2,2-Dimethylolpropionic acid (DMPA) | 220 g |
| N-methylpyrrolidone (NMP) | 1,347 g |

The mixture was heated to 60° C. to dissolve DMPA therein.

Next, 1,445 g (5.5 moles) of 4,4'-dicyclohexylmethane diisocyanate and 2.6 g of dibutyltin dilaurate serving as a catalyst were added thereto, and the mixture was heated to 90° C. to perform a urethane reaction for 5 hours. Thus, a urethane prepolymer having an isocyanate group at the end thereof was prepared. After the reaction product was cooled to 80° C., 149 g of triethylamine was added thereto, and 4,340 g of the mixture was mixed with 5,400 g of water and 15 g of triethylamine while strongly stirred. Next, 1,500 g of ice, and 626 g of a 35% aqueous solution of 2-methyl-1,5-pentanediamine were added to the mixture to perform a polymer chain growth reaction, and then the solvent was distilled away to control the solid content of the reaction product at 30%. Thus, a polycarbonate urethane resin emulsion 1 was prepared.

After a solid of the polycarbonate urethane resin was isolated form the polycarbonate urethane resin emulsion 1, a 30% aqueous dispersion liquid of the polycarbonate urethane resin was prepared so as to be used for measuring the minimum film forming temperature (MFT) of the polycarbonate urethane resin. As a result of measurement of the MFT of the polycarbonate urethane resin using an instrument FILM FORMING TEMPERATURE TESTER manufactured by Imoto Machinery Co., Ltd., the MFT of the resin was 55° C.

(2) Preparation of Polycarbonate Urethane Resin Emulsion 2

The procedure for preparation of the polycarbonate urethane resin emulsion 1 was repeated except that 4,4'-dicyclohexylmethane diisocyanate was replaced with the same molar amount of isophorone diisocyanate to prepare a polycarbonate urethane resin emulsion 2.

As a result of measurement of the MFT of the polycarbonate urethane resin using the method mentioned above, the MFT of the resin was 83° C.

(3) Preparation of Polycarbonate Urethane Resin Emulsion 3

The procedure for preparation of the polycarbonate urethane resin emulsion 1 was repeated except that the polycarbonatediol (i.e., reaction product of 1,6-hexanediol and dimethyl carbonate) was replaced with the same weight of another polycarbonatediol (reaction product of 3-methyl-1,5-pentanediol and diphenyl carbonate), and 2-methyl-1,5-pentanediamine serving as the polymer chain growing agent was replaced with the same molar amount of 1,6-hexamethylenediamine to prepare a polycarbonate urethane resin emulsion 3.

As a result of measurement of the MFT of the polycarbonate urethane resin using the method mentioned above, the MFT of the resin was 20° C.

(4) Preparation of Polycarbonate Urethane Resin Emulsion 4

The procedure for preparation of the polycarbonate urethane resin emulsion 1 was repeated except that 4,4'-dicyclohexylmethane diisocyanate was replaced with the same molar amount of hexamethylene diisocyanate to prepare a polycarbonate urethane resin emulsion 4.

As a result of measurement of the MFT of the polycarbonate urethane resin using the method mentioned above, the MFT of the resin was 61° C.

(5) Preparation of Polyether Urethane Resin Emulsion 5

The following compounds were fed into a reaction vessel, which is equipped with a thermometer, a nitrogen feed pipe, and a stirrer and which had been subjected to nitrogen substitution, to perform a reaction.

| | |
|---|---|
| Polyetherpolyol (PTMG 1000 from Mitsubishi Chemical Corporation having a molecular weight of 1,000) | 100.2 parts |
| 2,2-Dimethylolpropionic acid (DMPA) | 15.7 parts |
| Isophorone diisocyanate | 48.0 parts |
| Methyl ethyl ketone serving as an organic solvent | 77.1 parts |
| Dibutyltin dilaurate (DBTDL) serving as a catalyst | 0.06 parts |

After the reaction was performed for 4 hours, 30.7 parts of methyl ethyl ketone serving as a diluent was added thereto, and the reaction was further continued.

After it was confirmed that the reaction product has a molecular weight of from 20,000 to 60,000, 1.4 parts of methanol was added thereto to stop the reaction. Thus, an organic solvent solution of a urethane resin was prepared.

Next, 13.4 parts of a 48% aqueous solution of potassium hydroxide was added to the organic solvent solution of the urethane resin to neutralize the carboxyl groups of the urethane resin, and then 715.3 parts of water was added thereto, followed by stirring the mixture to perform aging and solvent removal. Thus, a polyether urethane resin emulsion 5 having a solid content of 30% was prepared.

As a result of measurement of the MFT of the polyether urethane resin using the method mentioned above, the MFT of the resin was 43° C.

(6) Preparation of Polyester Urethane Resin Emulsion 6

The procedure for preparation of the polyether urethane resin emulsion 5 was repeated except that polyether polyol (PTMG 1000) was replaced with 200.4 parts of a polyester polyol (POLYRITE OD-X-2251 manufactured by DIC Corporation and having a molecular weight of 2,000) to prepare a polyester urethane resin emulsion 6.

As a result of measurement of the MFT of the polyester urethane resin using the method mentioned above, the MFT of the resin was 74° C.

(7) Preparation of Polyester Urethane Resin Emulsion 7

The following compounds were fed into a 2-liter reaction vessel, which is equipped with a stirrer, a thermometer, a nitrogen feed pipe, and a condenser.

| | |
|---|---|
| Methyl ethyl ketone | 100 parts |
| Polyester polyol (1) (reaction product of an acid component including isophthalic acid (iPA) and adipic acid (AA) in a molar ratio of 6:4 and an alcohol component including ethylene glycol (EG) and neopentyl glycol (NPG) in a molar ratio of 1:9, which has a number average molecular weight of 2,000 and an average functional group number of 2) | 345 parts |
| 2,2-Dimethylolpropionic acid (DMPA) | 9.92 parts |

After the compounds were mixed at 60°, 45.1 parts of triethylene glycol diisocyanate (TEGDI) and 0.08 parts of dioctyltin dilaurate (DOTDL) were added to the mixture, and the mixture was reacted for 3 hours at 72° C. to prepare a polyurethane solution.

Next, 80 parts of isopropyl alcohol (IPA), 220 parts of methyl ethyl ketone (MEK), 3.74 parts of triethylamine (TEA), and 596 parts of water were added to the polyurethane solution to perform phase inversion, followed by removal of IPA and MEK using a rotary evaporator. Thus, a polyester urethane resin emulsion 7 was prepared.

After the thus prepared aqueous polyester urethane resin emulsion 7 was cooled to room temperature, ion-exchange water and an aqueous solution of sodium hydroxide were added to the emulsion to adjust the solid content and the pH to 30% and 8, respectively.

As a result of measurement of the MFT of the polyester urethane resin using the method mentioned above, the MFT of the resin was lower than −5° C. (which is the lowest detectable temperature of the instrument).

(8) Preparation of Acrylic Resin Emulsion 8

The following compounds were fed into a reaction vessel, which is equipped with a stirrer, a reflux condenser, a dropping device, and a thermometer.

| | |
|---|---|
| Ion-exchange water | 900 g |
| Sodium lauryl sulfate | 1 g |

The mixture was heated to 70° C. while stirred under a nitrogen gas flow. While the temperature of the mixture was controlled at 70° C., 4 g of potassium persulfate serving as a polymerization initiator was added to the mixture. After potassium persulfate was dissolved, an emulsion, which had been prepared by adding 20 g of acrylamide, 365 g of styrene, 545 g of butyl acrylate, and 10 g of methacrylic acid to a mixture of 450 g of ion-exchange water and 3 g of sodium lauryl sulfate while stirring the mixture, was continuously dropped into the reaction vessel over 4 hours.

After dropping the emulsion, the mixture was aged for 3 hours.

After the thus prepared aqueous acrylic resin emulsion was cooled to room temperature, ion-exchange water and an aqueous solution of sodium hydroxide were added to the emulsion to adjust the solid content and the pH to 30% and 8, respectively. Thus, an acrylic resin emulsion 8 was prepared.

As a result of measurement of the MFT of the acrylic resin using the method mentioned above, the MFT of the resin was 2° C.

(9) Preparation of Acrylic Resin Emulsion 9

The following compounds were fed into a reaction vessel, which is equipped with a stirrer, a reflux condenser, a dropping device, and a thermometer.

| | |
|---|---|
| Ion-exchange water | 900 g |
| Sodium lauryl sulfate | 1 g |

The mixture was heated to 70° C. while stirred under a nitrogen gas flow. While the temperature of the mixture was controlled at 70° C., 4 g of potassium persulfate serving as a polymerization initiator was added to the mixture. After potassium persulfate was dissolved, an emulsion, which had been prepared by adding 20 g of acrylamide, 615 g of styrene, 30 g of butyl acrylate, and 350 g of methacrylic acid to a mixture of 450 g of ion-exchange water and 3 g of sodium lauryl sulfate while stirring the mixture, was continuously dropped into the reaction vessel over 4 hours.

After dropping the emulsion, the mixture was aged for 3 hours.

After the thus prepared aqueous acrylic resin emulsion was cooled to room temperature, ion-exchange water and an aqueous solution of sodium hydroxide were added to the emulsion to adjust the solid content and the pH to 30% and 8, respectively. Thus, an acrylic resin emulsion 9 was prepared.

As a result of measurement of the MFT of the acrylic resin using the method mentioned above, the MFT of the resin was 53° C.

(10) Preparation of White Pigment Dispersion Liquid (Titanium Oxide Dispersion Liquid)

The following compounds were mixed.

| | |
|---|---|
| Titanium oxide (STR-100W from Sakai Chemical Industry Co., Ltd.) | 25 parts |
| Pigment dispersant (TEGO DISPERS 651 from Evonik Industries) | 5 parts |
| Water | 70 parts |

The mixture was subjected to a dispersing treatment for 5 minutes using a bead mill, RESEARCH LABO from Shinmaru Enterprises Corporation. The dispersing condition was the following.

Beads used: Zirconia beads with a diameter of 0.3 mm
Filling factor of beads: 60%
Rotation speed of rotor: 8 m/s Thus, a white pigment dispersion liquid was prepared.

(11) Dispersion Liquid of Particulate White Hollow Resin

A marketed product, SX8782(D), which is a 28% aqueous dispersion liquid of a particulate hollow styrene-acrylic copolymer from JSR Corporation and in which hollow particles of the copolymer having an outer diameter of 1.0 µm and an inner diameter of 0.8 µm are dispersed, was used as the particulate white hollow resin.

(12) Preparation of Black Pigment Dispersion Liquid

The following compounds were mixed.

| | |
|---|---|
| Carbon black (MONARCH 800 from Cabot Corporation) | 15 parts |
| Anionic surfactant (PIONINE A-51-B from TAKEMOTO OIL & FAT CO., LTD.) | 2 parts |
| Ion-exchange water | 83 parts |

The mixture was subjected to a dispersing treatment for 7 hours using a disk type bead mill, KDL from Shinmaru Enterprises Corporation. The dispersing condition was the following.

Beads used: Zirconia beads with a diameter of 0.3 mm

Thus, a black pigment dispersion liquid was prepared.

(13) Preparation of Cyan Pigment Dispersion Liquid

The procedure for preparation of the black pigment dispersion liquid was repeated except that the carbon black was replaced with a cyan pigment, Pigment Blue 15:4, to prepare a cyan pigment dispersion liquid.

(14) Preparation of Magenta Pigment Dispersion Liquid

The procedure for preparation of the black pigment dispersion liquid was repeated except that the carbon black was replaced with a magenta pigment, Pigment Red 122, to prepare a magenta pigment dispersion liquid.

(15) Preparation of Yellow Pigment Dispersion Liquid

The procedure for preparation of the black pigment dispersion liquid was repeated except that the carbon black was replaced with a yellow pigment, Pigment Yellow 74, to prepare a yellow pigment dispersion liquid.

Preparation of White Inks for Use as First or Second Ink in Examples and Comparative Examples According to the formulae described in Tables 1 to 3 below, the white pigment dispersion liquid (i.e., titanium oxide dispersion liquid) or the white hollow resin dispersion liquid, a resin emulsion, a surfactant, 1,2-propanediol, diethylene glycol-n-butyl ether, an antiseptic (PROXEL LV from Avecia Ltd.), and highly pure water were mixed while stirred.

The mixture was filtered using a polypropylene filter having openings of 0.2 µm to prepare white inks to be used as the first or second ink in Examples and Comparative Examples.

The surfactant described in Tables 1 to 3 and used for the white inks is a nonionic surfactant, SOFTANOL EP-5035 (higher alcohol ethoxylate) from Nippon Shokubai Co., Ltd.

Preparation of Clear Ink for Use as First Ink in Example 17

According to the formula described in Table 1-2 below, a resin emulsion, a surfactant, 1,2-propanediol, diethylene glycol-n-butyl ether, the antiseptic (PROXEL LV from Avecia Ltd.), and highly pure water were mixed while stirred. The clear ink did not include a pigment dispersion liquid or a white hollow resin dispersion liquid.

The mixture was filtered using a polypropylene filter having openings of 0.2 µm to prepare a clear inks to be used as the first ink in Example 17.

The surfactant used for the clear ink in Example 17 is a nonionic surfactant, SOFTANOL EP-5035 (higher alcohol ethoxylate) from Nippon Shokubai Co., Ltd.

Preparation of Non-White Inks for Use as First or Second Ink in Examples and Comparative Examples According to the formulae described in Tables 1 to 4 below, a non-white pigment dispersion liquid, a resin emulsion, a surfactant, 1,2-propanediol, diethylene glycol-n-butyl ether, an antiseptic (PROXEL LV from Avecia Ltd.), and highly pure water were mixed while agitated.

The mixture was filtered using a polypropylene filter having openings of 0.2 µm to prepare non-white inks to be used as the first or second ink in Examples and Comparative Examples.

The surfactant described in Tables 1 to 4 and used for the non-white inks is a nonionic surfactant, SOFTANOL EP-5035 (higher alcohol ethoxylate) from Nippon Shokubai Co., Ltd.

In addition, in Tables 1 to 4, (K), (C), (M) and (Y) represents the black, cyan, magenta and yellow pigment dispersion liquids, respectively.

Numbers in Tables 1-4 represent weight ratios in parts.

TABLE 1

| Formula of first ink | Ex. 1 | Ex. 2 | Ex. 3 | Ex. 4 | Ex. 5 | Ex. 6 | Ex. 7 | Ex. 8 | Ex. 9 | Ex. 10 |
|---|---|---|---|---|---|---|---|---|---|---|
| Titanium oxide dispersion liquid | 20 | 20 | 20 | 20 | 20 | 20 | 20 | 20 | 20 | 20 |
| Dispersion liquid of particulate white | | | | | | | | | | |

TABLE 1-continued

| | | | | | | | | | | |
|---|---|---|---|---|---|---|---|---|---|---|
| hollow resin | | | | | | | | | | |
| Non-white pigment dispersion liquid | | | | | | | | | | |
| Polycarbonate urethane resin emulsion 1 (MFT of 55° C.) | | | | | | | | | | |
| Polycarbonate urethane resin emulsion 2 (MFT of 83° C.) | | | | | | | | | | |
| Polycarbonate urethane resin emulsion 3 (MFT of 20° C.) | 15 | 15 | 15 | 15 | 15 | | | | | |
| Polyester urethane resin emulsion 7 (MFT of lower than −5° C.) | | | | | | 15 | 15 | 15 | 15 | 15 |
| Acrylic resin emulsion 8 (MFT of 2° C.) | | | | | | | | | | |
| Surfactant | 2 | 2 | 2 | 2 | 2 | 2 | 2 | 2 | 2 | 2 |
| 1,2-Propanediol | 20 | 20 | 20 | 20 | 20 | 20 | 20 | 20 | 20 | 20 |
| 1,3-Propanediol | | | | | | | | | | |
| 1,2-Butanediol | | | | | | | | | | |
| Diethylene glycol n-butyl ether | 10 | 10 | 10 | 10 | 10 | 10 | 10 | 10 | 10 | 10 |
| PROXEL LV | 0.1 | 0.1 | 0.1 | 0.1 | 0.1 | 0.1 | 0.1 | 0.1 | 0.1 | 0.1 |
| Highly pure water | Balance | Balance | Balance | Balance | Balance | Balance | Balance | Balance | Balance | Balance |
| Total amount | 100 | 100 | 100 | 100 | 100 | 100 | 100 | 100 | 100 | 100 |

| Formula of first ink | Ex. 11 | Ex. 12 | Ex. 13 | Ex. 14 | Ex. 15 | Ex. 16 | Ex. 17 | Ex. 18 | Ex. 19 | Ex. 20 |
|---|---|---|---|---|---|---|---|---|---|---|
| Titanium oxide dispersion liquid | 20 | 20 | 30 | 20 | 20 | | | | | 20 |
| Dispersion liquid of particulate white hollow resin | | | | | | 20 | | | | |
| Non-white pigment dispersion liquid | | | | | | | | (K)20 | (K)20 | |
| Polycarbonate urethane resin emulsion 1 (MFT of 55° C.) | | | | | | | | | | |
| Polycarbonate urethane resin emulsion 2 (MFT of 83° C.) | | | | | | | | | | |
| Polycarbonate urethane resin emulsion 3 (MFT of 20° C.) | | | | | | | | | | |
| Polyester urethane resin emulsion 7 (MFT of lower than −5° C.) | 15 | 10 | 15 | 15 | 15 | 15 | 15 | 15 | 15 | |
| Acrylic resin emulsion 8 (MFT of 2° C.) | | | | | | | | | | 15 |
| Surfactant | 2 | 2 | 2 | 2 | 2 | 2 | 2 | 2 | 2 | 2 |
| 1,2-Propanediol | 20 | 20 | 20 | | | 20 | 20 | 20 | 20 | 20 |
| 1,3-Propanediol | | | | 20 | | | | | | |
| 1,2-Butanediol | | | | | 20 | | | | | |
| Diethylene glycol n-butyl ether | 10 | 10 | 10 | 10 | 10 | 10 | 10 | 10 | 10 | 10 |
| PROXEL LV | 0.1 | 0.1 | 0.1 | 0.1 | 0.1 | 0.1 | 0.1 | 0.1 | 0.1 | 0.1 |
| Highly pure water | Balance | Balance | Balance | Balance | Balance | Balance | Balance | Balance | Balance | Balance |
| Total amount | 100 | 100 | 100 | 100 | 100 | 100 | 100 | 100 | 100 | 100 |

TABLE 2

| Formula of first ink | Comp. Ex. 1 | Comp. Ex. 2 | Comp. Ex. 3 | Comp. Ex. 4 | Comp. Ex. 5 | Comp. Ex. 6 |
|---|---|---|---|---|---|---|
| Titanium oxide dispersion liquid | 20 | 20 | 20 | 20 | 20 | 20 |
| Polycarbonate urethane resin emulsion 1 (MFT of 55° C.) | 15 | 15 | | | | |
| Polycarbonate urethane resin emulsion 2 (MFT of 83° C.) | | | 15 | | | |
| Polycarbonate urethane resin emulsion 3 (MFT of 20° C.) | | | | | | 15 |
| Polyester urethane resin emulsion 7 (MFT of lower than −5° C.) | | | | 15 | | |
| Acrylic resin emulsion 8 (MFT of 2° C.) | | | | | 15 | |
| Surfactant | 2 | 2 | 2 | 2 | 2 | 2 |
| 1,2-Propanediol | 20 | 20 | 20 | 20 | 20 | 20 |
| Diethylene glycol n-butyl ether | 10 | 10 | 10 | 10 | 10 | 10 |
| PROXEL LV | 0.1 | 0.1 | 0.1 | 0.1 | 0.1 | 0.1 |
| Highly pure water | Balance | Balance | Balance | Balance | Balance | Balance |
| Total amount | 100 | 100 | 100 | 100 | 100 | 100 |

TABLE 3

| Formula of second ink | Ex. 1 | Ex. 2 | Ex. 3 | Ex. 4 | Ex. 5 | Ex. 6 | Ex. 7 | Ex. 8 | Ex. 9 | Ex. 10 |
|---|---|---|---|---|---|---|---|---|---|---|
| Titanium oxide dispersion liquid | | | | | | | | | | |
| Non-white pigment dispersion liquid | (K)20 | (K)20 | (K)20 | (K)20 | (K)20 | (K)20 | (K)20 | (C)20 | (M)20 | (Y)20 |
| Polycarbonate urethane resin emulsion 1 (MFT of 55° C.) | 15 | | | | | | | | | |
| Polycarbonate urethane resin emulsion 2 (MFT of 83° C.) | | 15 | | | | | 15 | 15 | 15 | 15 |
| Polycarbonate urethane resin emulsion 4 (MFT of 61° C.) | | | 15 | | | | | | | |
| Polyether urethane resin emulsion 5 (MFT of 43° C.) | | | | 15 | | 15 | | | | |
| Polyester urethane resin emulsion 6 (MFT of 74° C.) | | | | | 15 | | | | | |
| Polyester urethane resin emulsion 7 (MFT of lower than −5° C.) | | | | | | | | | | |
| Acrylic resin emulsion 9 (MFT of 53° C.) | | | | | | | | | | |
| Surfactant | 2 | 2 | 2 | 2 | 2 | 2 | 2 | 2 | 2 | 2 |
| 1,2-Propanediol | 20 | 20 | 20 | 20 | 20 | 20 | 20 | 20 | 20 | 20 |
| 1,3-Propanediol | | | | | | | | | | |
| 1,2-Butanediol | | | | | | | | | | |
| Diethylene glycol n-butyl ether | 10 | 10 | 10 | 10 | 10 | 10 | 10 | 10 | 10 | 10 |
| PROXEL LV | 0.1 | 0.1 | 0.1 | 0.1 | 0.1 | 0.1 | 0.1 | 0.1 | 0.1 | 0.1 |
| Highly pure water | Balance | Balance | Balance | Balance | Balance | Balance | Balance | Balance | Balance | Balance |
| Total amount | 100 | 100 | 100 | 100 | 100 | 100 | 100 | 100 | 100 | 100 |

TABLE 3-continued

| Formula of second ink | Ex. 11 | Ex. 12 | Ex. 13 | Ex. 14 | Ex. 15 | Ex. 16 | Ex. 17 | Ex. 18 | Ex. 19 | Ex. 20 |
|---|---|---|---|---|---|---|---|---|---|---|
| Titanium oxide dispersion liquid | | | | | | | | 20 | | |
| Pigment dispersion liquid | (K)20 | (K)20 | (K)20 | (K)20 | (K)20 | (K)20 | (K)20 | | | (K)20 |
| Polycarbonate urethane resin emulsion 1 (MFT of 55° C.) | | | | | | | | | | |
| Polycarbonate urethane resin emulsion 2 (MFT of 83° C.) | 15 | 10 | 15 | 10 | 10 | 15 | 15 | 15 | 15 | |
| Polycarbonate urethane resin emulsion 4 (MFT of 61° C.) | | | | | | | | | | |
| Polyether urethane resin emulsion 5 (MFT of 43° C.) | | | | | | | | | | |
| Polyester urethane resin emulsion 6 (MFT of 74° C.) | | | | | | | | | | |
| Polyester urethane resin emulsion 7 (MFT of lower than −5° C.) | | | | | | | | | | |
| Acrylic resin emulsion 9 (MFT of 53° C.) | | | | | | | | | | 15 |
| Surfactant | 2 | 2 | 2 | 2 | 2 | 2 | 2 | 2 | 2 | 2 |
| 1,2-Propanediol | 20 | 20 | 20 | 20 | 20 | 20 | 20 | 20 | 20 | 20 |
| 1,3-Propanediol | | | | | | | | | | |
| 1,2-Butanediol | | | | | | | | | | |
| Diethylene glycol n-butyl ether | 10 | 10 | 10 | 10 | 10 | 10 | 10 | 10 | 10 | 10 |
| PROXEL LV | 0.1 | 0.1 | 0.1 | 0.1 | 0.1 | 0.1 | 0.1 | 0.1 | 0.1 | 0.1 |
| Highly pure water | Balance | Balance | Balance | Balance | Balance | Balance | Balance | Balance | Balance | Balance |
| Total amount | 100 | 100 | 100 | 100 | 100 | 100 | 100 | 100 | 100 | 100 |

TABLE 4

| Formula of second ink | Comp. Ex. 1 | Comp. Ex. 2 | Comp. Ex. 3 | Comp. Ex. 4 | Comp. Ex. 5 | Comp. Ex. 6 |
|---|---|---|---|---|---|---|
| Pigment dispersion | (K)20 | (K)20 | (K)20 | (K)20 | (K)20 | (K)20 |
| Polycarbonate urethane resin emulsion 2 (MFT of 83° C.) | | | 15 | | 15 | |
| Polycarbonate urethane resin emulsion 3 (MFT of 20° C.) | 15 | | | | | |
| Polyester urethane resin emulsion 7 (MFT of lower than −5° C.) | | 15 | | 15 | | |
| Acrylic resin emulsion 9 (MFT of 53° C.) | | | | | | 15 |
| Surfactant | 2 | 2 | 2 | 2 | 2 | 2 |
| 1,2-Propanediol | 20 | 20 | 20 | 20 | 20 | 20 |
| Diethylene glycol n-butyl ether | 10 | 10 | 10 | 10 | 10 | 10 |
| PROXEL LV | 0.1 | 0.1 | 0.1 | 0.1 | 0.1 | 0.1 |
| Highly pure water | Balance | Balance | Balance | Balance | Balance | Balance |
| Total amount | 100 | 100 | 100 | 100 | 100 | 100 |

The thus prepared inks were evaluated by the following methods. The evaluation results are shown in Table 5 below.

In the evaluation of adhesiveness with base materials (recording media) and abrasion resistance, evaluation criteria severer than in a case in which paper is used as the base material were set because it is possible for the print of this disclosure to be used for outdoor applications.

It can be understood from the evaluation results that the inkjet ink is suitable for outdoor applications.

1. Evaluation Method

Each of the ink sets of the first and second inks was set to an inkjet printer, modified version of IPSIO GX e5500 from Ricoh Co., Ltd., and a solid image was formed by the first ink on each of a polyvinyl chloride (PVC) film and a polyethylene terephthalate (PET) film serving as the base material, and then a solid image was formed thereon by the second ink. The layered images were dried for one hour at 80° C. except for the layered image of the ink set of Example 11. In Example 11, the layered image was allowed to settle for one night at 25° C. to be dried.

With respect to the ink set of Example 17, a clear ink was used as the first ink.

With respect to the ink set of Example 18, a solid image was formed by a black (K) ink serving as the first ink, and then a solid image was formed thereon by a white ink. The layered image was dried for one hour at 80° C.

With respect to the ink set of Example 19, a solid image was formed by a black (K) ink serving as the first ink, and then a solid image was formed thereon by a clear ink. The layered image was dried for one hour at 80° C.

The adhesiveness with base materials, the abrasion resistance, and glossiness of the layered images were evaluated as follows.

(1) Adhesiveness with Base Materials

Each of the layered images was subjected to the following peeling test.

(a) The layered solid image was cut in a grid pattern to form more than 100 rectangular image portions;
(b) A cloth adhesive tape (123LW-50 from Nichiban Co., Ltd.) was adhered to the cut solid image, and then the tape was peeled from the cut solid image; and
(c) The rectangular image portions were visually observed to determine the number of rectangular image portions of the cut solid image remaining on the base material per 100 rectangular image portions.

The adhesiveness of the ink set with the base materials was graded as follows.
AA (Excellent): The number of remaining rectangular image portions is not less than 98.
A (Good): The number of remaining rectangular image portions is not less than 90 and less than 98.
B (Acceptable): The number of remaining rectangular image portions is not less than 70 and less than 90.
C (Unacceptable): The number of remaining rectangular image portions is less than 70.

(2) Glossiness of Image

The 60° glossiness of each of the layered solid images was measured four times using a gloss meter 4501 from BYK-Gardener, and the four data were averaged.

The glossiness of image of the ink set was graded as follows.
AA (Excellent): The glossiness is not less than 100.
A (Good): The glossiness is not less than 90 and less than 100.
B (Acceptable): The glossiness is not less than 80 and less than 90.
C (Unacceptable): The glossiness is not less than 70 and less than 80.
D (Wholly unacceptable): The glossiness is less than 70.

(3) Abrasion Resistance

Each of the layered solid images was rubbed with a dry cotton cloth (Shirting No. 3) while applying a load of 400 g to the cloth, and the rubbed image was visually observed to determine whether the image is damaged. The abrasion resistance of image of the ink set was graded as follows.
AA (Excellent): The image is not damaged even when the image is rubbed 50 times or more.
A (Good): The image has weak flaws when the image is rubbed 50 times, but the image density does not change.
B (Acceptable): The density of the image changes when the image is rubbed 31 to 50 times.
C (Unacceptable): The density of the image changes when the image is rubbed 30 times or less.

TABLE 5

| | Adhesiveness with PVC | Adhesiveness with PET | Abrasion resistance | Glossiness |
|---|---|---|---|---|
| Ex. 1 | A | A | AA | AA |
| Ex. 2 | A | A | AA | AA |
| Ex. 3 | A | A | A | A |
| Ex. 4 | A | A | B | A |
| Ex. 5 | A | A | A | A |
| Ex. 6 | AA | AA | B | B |
| Ex. 7 | AA | AA | AA | AA |
| Ex. 8 | AA | AA | AA | AA |
| Ex. 9 | AA | AA | AA | AA |
| Ex. 10 | AA | AA | AA | AA |
| Ex. 11 | A | A | A | AA |
| Ex. 12 | A | A | A | AA |
| Ex. 13 | AA | AA | A | AA |
| Ex. 14 | AA | AA | AA | AA |
| Ex. 15 | AA | AA | AA | AA |
| Ex. 16 | AA | AA | AA | AA |
| Ex. 17 | AA | AA | AA | AA |
| Ex. 18 | AA | AA | AA | AA |
| Ex. 19 | AA | AA | AA | AA |
| Ex. 20 | A | B | B | A |
| Comp. Ex. 1 | C | C | C | A |
| Comp. Ex. 2 | C | C | C | A |
| Comp. Ex. 3 | C | C | A | B |
| Comp. Ex. 4 | AA | A | C | D |
| Comp. Ex. 5 | A | B | B | C |
| Comp. Ex. 6 | B | C | C | C |

The following can be understood from Tables 1-5.

The ink sets of Examples 7 to 10 are preferable examples of the inkjet ink (ink set) of this disclosure. Each ink set has excellent adhesiveness with the base materials, and can produce images having a good combination of glossiness and abrasion resistance.

Since the first resin (i.e., resin A) of the ink sets of Examples 1 and 2 has a MFT of higher than 0° C., the film forming ability of the ink sets is slightly inferior to those of the ink sets of Examples 7 to 10, and therefore the adhesiveness of the ink images thereof with the base materials is slightly inferior to those of the ink sets of Examples 7 to 10.

Although the ink set of Example 3 includes a polycarbonate urethane resin, the polycarbonate urethane resin does not have a structure derived from an alicyclic diisocyanate, and therefore the abrasion resistance of the ink images thereof is slightly inferior to those of the ink sets of Examples 1, 2 and 6. However, the ink set of Example 3 can deliver good performance as a whole.

Since the second ink (i.e., resin B) of the ink sets of Examples 4 to 6 is a urethane resin other than polycarbonate urethane resins, the abrasion resistance of the ink images thereof is slightly inferior to those of the ink sets of Examples 1, 2 and 6. In addition, since the MFT of the first resin (i.e., resin A) of the ink sets of Examples 4 and 5 is not lower than 0° C., the adhesiveness of the ink images thereof with the base materials is slightly inferior to those of the ink sets of Examples 1, 2 and 6. Further, since the MFT of the second resin (i.e., resin B) of the ink sets of Examples 4 and 6 is lower than 50° C., the strength of the ink films slightly deteriorates, and therefore the abrasion resistance of the ink images thereof is slightly inferior to that of the ink set of Example 5.

Since the heating process is not performed after printing in Example 11, the performance of the ink set is slightly inferior to those of the ink sets of Examples 7 to 10. However, the inkjet recording method is usable.

In Examples 12 and 13, the added amount of the resin is relatively small compared to that of the pigment dispersion liquid. Since the added amount of the resin is decreased in the first ink of Example 12, the adhesiveness and the abrasion resistance of the ink image are slightly inferior to those of the ink image in Example 6. In Example 13, the amount of the resin in the first ink does not change, but the amount of the pigment dispersion liquid increases. Therefore, the amount of the resin covering the pigment particles decreases, and the abrasion resistance of the ink image is slightly inferior to that of the ink image in Example 6.

Although the aqueous organic solvent is changed in Examples 14 and 15, the properties of the ink sets do not change.

In Example 16, a particulate hollow resin is used as the white pigment instead of titanium oxide, but the properties of the ink set do not change.

In Example 17, a clear ink is used as the first ink instead of the white ink, but the properties of the ink set do not change.

In Examples 18 and 19, a black (K) ink is used as the first ink instead of the white ink and a white ink or a clear ink is used as the second ink, but the properties of the ink sets do not change.

In Example 20, acrylic resins are used as the first and second resins. All the properties of the ink set are inferior to those of the ink set of Example 6, which uses urethane resins as the first and second resins, although the properties are at or above the acceptable levels.

In Comparative Examples 1 and 2, the MFT of the first resin (resin A) is higher than that of the second resin (resin B). The adhesiveness with the base materials and the abrasion resistance of the ink images thereof are poor.

In Comparative Example 3, a resin having a high MFT is used as the first and second resins. Although the ink set has good abrasion resistance, the adhesiveness of the ink image with the base materials is poor.

In contrast, in Comparative Example 4, a resin having a low MFT is used as the first and second resins. Although the ink image of the ink set has good adhesiveness with the base materials, the abrasion resistance thereof is poor.

In Comparative Examples 5 and 6, any one of the first and second resins is an acrylic resin. Since the resin has poor affinity for the urethane resin used as the first or second resin, the evenness of the ink film (ink image) deteriorates, thereby decreasing the glossiness of the ink film.

Effect of the Ink Set of this Disclosure

As mentioned above, when images are printed on non-porous base materials using the ink set of this disclosure, the ink images have high glossiness while being strongly adhered to the base materials. In addition, the ink images (prints) have good abrasion resistance.

Additional modifications and variations of the present invention are possible in light of the above teachings. It is therefore to be understood that within the scope of the appended claims the invention may be practiced other than as specifically described herein.

What is claimed is:
1. An inkjet ink set comprising:
    a first ink including a resin A and an organic solvent A; and
    a second ink including a resin B and an organic solvent which is the same as or different from the organic solvent A;
    wherein:
    a minimum film forming temperature of the resin is lower a minimum film forming temperature of the resin B;
    the minimum film forming temperature of the resin A is lower than 0° C.
2. The inkjet ink set according to claim 1, wherein the minimum film forming temperature of the resin A is lower than the minimum film forming temperature of the resin B by 30° C. or more.
3. The inkjet ink set according to claim 1, wherein the minimum film forming temperature of the resin B is not lower than 50° C. and lower than 200° C.
4. The inkjet ink set according to claim 1, wherein at least one of the first ink and the second ink includes a colorant.
5. The inkjet ink set according to claim 1, wherein one of the first ink and the second ink is a white ink and the other is a non-white ink.
6. The inkjet ink set according to claim 1, herein each of the resin A and the resin B is granular.
7. The inkjet ink set according to claim 1, wherein each of the first ink and the second ink further includes water.
8. The inkjet ink set according to claim 1, wherein each of the first ink and the second ink further includes water and a colorant.
9. The inkjet ink set according to claim 1, wherein each of the resin A and the resin B is a urethane resin.
10. The inkjet ink set according to claim 9, wherein the urethane resin is a polycarbonate urethane resin.
11. The inkjet ink set according to claim 10, wherein the polycarbonate urethane resin includes a unit obtained from an alicyclic diisocyanate.
12. An inkjet recording method comprising:
    ejecting droplets of the first ink of the inkjet ink set according to claim 1 by applying at least one of heat energy and mechanical energy thereto to form a first layer on a recording medium; and
    ejecting droplets of the second ink of the inkjet ink set by applying at least one of heat energy and mechanical energy thereto to form a second layer on the first layer.
13. The inkjet recording method according to claim 12, further comprising:
    heating the recording medium bearing the first layer and the second layer thereon,
    wherein the first ink is a white ink, and the second ink is a non-white ink.
14. A print comprising:
    a recording medium; and
    an ink image including a first layer and a second layer, wherein the first layer is formed on the recording medium by the first ink of the inkjet ink set according to claim 1 and the second layer is formed on the first layer by the second ink of the inkjet ink set.

* * * * *